US 12,429,579 B2

(12) United States Patent
Chang et al.

(10) Patent No.: US 12,429,579 B2
(45) Date of Patent: Sep. 30, 2025

(54) RADAR DETECTION SYSTEM AND RADAR FIELD OF VIEW DIRECTION ADJUSTMENT METHOD

(71) Applicant: Wistron Corporation, New Taipei (TW)

(72) Inventors: Yao-Tsung Chang, New Taipei (TW); Yin-Yu Chen, New Taipei (TW); Chuan-Yen Kao, New Taipei (TW); Kai-Jen Cheng, New Taipei (TW); Cheng-Nung Liao, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 500 days.

(21) Appl. No.: 17/851,302

(22) Filed: Jun. 28, 2022

(65) Prior Publication Data

US 2023/0280459 A1    Sep. 7, 2023

(30) Foreign Application Priority Data

Mar. 3, 2022    (TW) ................... 111107829

(51) Int. Cl.
*G01S 13/89*    (2006.01)
*G01S 13/72*    (2006.01)

(52) U.S. Cl.
CPC .............. *G01S 13/89* (2013.01); *G01S 13/72* (2013.01)

(58) Field of Classification Search
CPC .................. G01S 13/72; G01S 13/89
See application file for complete search history.

(56) References Cited

U.S. PATENT DOCUMENTS

| 11,867,789 B2* | 1/2024 | Sudarsan ............. G01S 13/931 |
| 2006/0075448 A1* | 4/2006 | McAlpine ............ G01S 3/7864 |
| | | 348/E7.079 |

(Continued)

FOREIGN PATENT DOCUMENTS

| CN | 105814609 B | 11/2019 |
| CN | 113794922 A | 12/2021 |

(Continued)

OTHER PUBLICATIONS

Zhao, et al., "Tracking and Identifying People with Millimeter Wave Radar", Department of Computer Science, University of Oxford, DeepMind.

(Continued)

*Primary Examiner* — Robert W Hodge
*Assistant Examiner* — Helena H Seraydaryan
(74) *Attorney, Agent, or Firm* — McClure, Qualey & Rodack, LLP

(57) ABSTRACT

A radar detection system and a radar field of view (FOV) direction adjustment method are provided. A processing unit of the radar detection system performs the following steps in one scanning round: obtaining at least one cluster of a current frame and a current status and a next status of each cluster based on digital feedback signals; and determining a displacement, determining, based on the current status of a tracked cluster in the at least one cluster and the displacement, whether the tracked cluster is located on an edge of a current FOV of a radar unit, and sending a control signal based on the next status of the tracked cluster in response to the tracked cluster being located on the edge of the current FOV, to adjust an FOV direction of the radar unit.

18 Claims, 17 Drawing Sheets

(56) References Cited

U.S. PATENT DOCUMENTS

2009/0052737 A1* 2/2009 Lycett .................... G01S 13/91
  382/103
2016/0101358 A1* 4/2016 Ibrahim ................. G06T 7/292
  463/31
2022/0269926 A1* 8/2022 Pavlov ................... G06N 3/044

FOREIGN PATENT DOCUMENTS

CN        113985395 A    1/2022
TW           I420906 B   12/2013

OTHER PUBLICATIONS

Feng, Jim, "Millimeter-wave Radar Point Cloud Classification and Interference Mitigation", University of Arizona, 2020.
Minmin Luo and Kaibin Wu, "Heart rate prediction model based on neural network", IOP Conf. Ser.: Mater. Sci. Eng. 2020.
Alharbi, et al., "Real-Time System Prediction for Heart Rate Using Deep Learning and Stream Processing Platforms", 2021.
Examination report dated Oct. 18, 2022, listed in related Taiwan patent application No. 111107829.

* cited by examiner

RADAR DETECTION SYSTEM AND RADAR FIELD OF VIEW DIRECTION ADJUSTMENT METHOD

CROSS-REFERENCE TO RELATED APPLICATION

This non-provisional application claims priority under 35 U.S.C. § 119(a) to U.S. Pat. No. 11,110,7829 filed in Taiwan, R.O.C. on Mar. 3, 2022, the entire contents of which are hereby incorporated by reference.

BACKGROUND

Technical Field

The present invention relates to the field of radar detection, and in particular, to a technology of applying a frequency modulated continuous wave (FMCW) signal to the field of radar detection.

Related Art

In recent years, a radar detection technology has developed vigorously, and related technologies have been gradually applied to patient care, long-term care for the elderly, and infant care. For general infants, bedridden patients, or the elderly, a radar only needs to detect an area on the bed. Therefore, a radar having a fixed pointing area may be used. However, for movable attendees, the radar loses a detection signal and cannot detect physiological information of the attendees when the attendees are out of a field of view (FOV) direction of the radar.

SUMMARY

In view of this, some embodiments of the present invention provide a radar detection system, a field of view (FOV) direction adjustment method, a computer-readable storage medium storing a program, and a non-transitory computer program product, to alleviate the current technical problem.

Some embodiments of the present invention provide a radar detection system. The radar detection system includes a radar unit, a pointing control unit, and a processing unit. The radar unit is configured to generate a radio frequency signal. The radar unit radiates the radio frequency signal, receives a feedback signal, and demodulates and digitalizes the feedback signal to obtain a digital feedback signal. The pointing control unit is configured to adjust an FOV direction of the radar unit based on a control signal. The processing unit is configured to perform the following steps in one scanning round: obtaining at least one cluster of a current frame and a current status and a next status of each cluster based on the digital feedback signal; determining a displacement, and determining, based on the current status of a tracked cluster in the at least one cluster and the displacement, whether the tracked cluster is located on an edge of a current FOV of the radar unit; and sending the control signal based on the next status of the tracked cluster in response to the tracked cluster being located on the edge of the current FOV, to adjust the FOV direction of the radar unit.

Some embodiments of the present invention provide a radar FOV direction adjustment method applicable to a radar detection system and performed by a processing unit of a radar detection system. The radar detection system includes a radar unit, a pointing control unit, and a processing unit. The radar unit is configured to generate a radio frequency signal. The radar unit radiates the radio frequency signal, receives a feedback signal, and demodulates and digitalizes the feedback signal to obtain a digital feedback signal. The pointing control unit is configured to adjust an FOV direction of the radar unit based on a control signal. The FOV direction adjustment method includes performing the following steps in one scanning round: obtaining at least one cluster of a current frame and a current status and a next status of each cluster based on the digital feedback signal; determining a displacement, and determining, based on the current status of a tracked cluster in the at least one cluster and the displacement, whether the tracked cluster is located on an edge of a current FOV of the radar unit; and sending the control signal based on the next status of the tracked cluster in response to the tracked cluster being located on the edge of the current FOV, to adjust the FOV direction of the radar unit.

Some embodiments of the present invention provide a computer-readable storage medium storing a program and a non-transitory computer program product. When the program is loaded and performed by a processor, the foregoing FOV direction adjustment method can be completed.

Based on the above, in some embodiments of the present invention, radar detection and radar tracking are integrated, and the FOV direction of a radar is adjusted to break the limit of a fixed position.

BRIEF DESCRIPTION OF THE DRAWINGS

FIG. 4-1 is a schematic diagram of field of view (FOV) direction adjustment according to an embodiment of the present invention.

FIG. 4-2 is a schematic diagram of the FOV direction adjustment according to an embodiment of the present invention.

FIG. 5-1 is a schematic operation diagram of the radar detection system according to some embodiments of the present invention.

FIG. 5-2 is a schematic operation diagram of the radar detection system according to some embodiments of the present invention.

FIG. 5-3 is a schematic operation diagram of the radar detection system according to some embodiments of the present invention.

FIG. 12-1 is a flowchart of a radar FOV direction adjustment method according to some embodiments of the present invention.

FIG. 12-2 is a flowchart of the radar FOV direction adjustment method according to some embodiments of the present invention.

DETAILED DESCRIPTION

Figure 1:
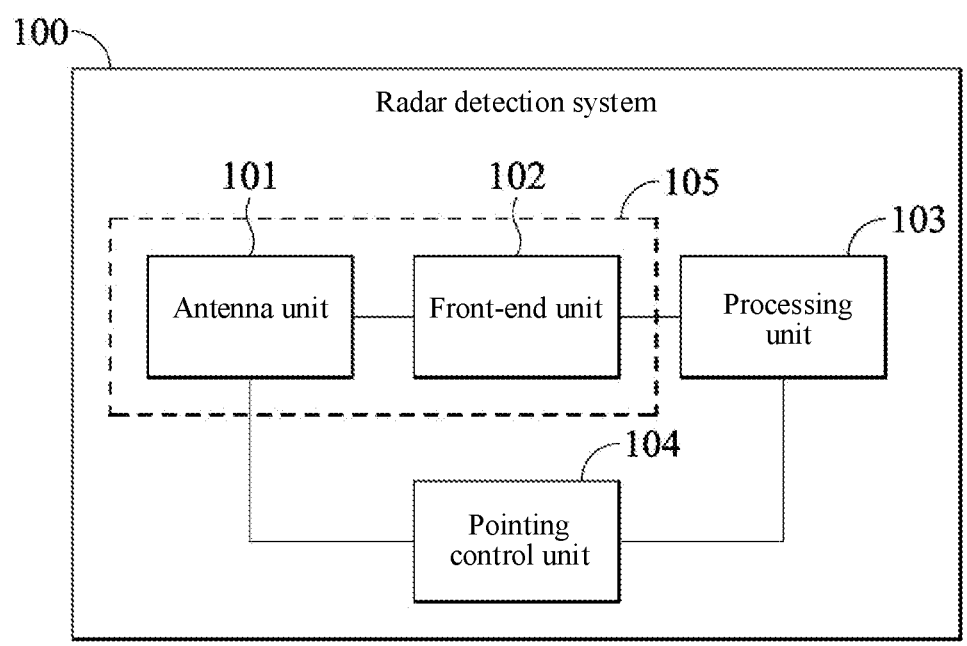
FIG. 1 is a block diagram of a radar detection system according to an embodiment of the present invention.

The foregoing and other technical content, features, and effects of the present invention can be clearly presented below in detailed description with reference to embodiments of the accompanying drawings. Thicknesses or sizes of the elements in the drawings expressed in an exaggerated, omitted or general manner are used to help a person skilled in the art to understand and read, and the sizes of elements are not completely actual sizes and are not intended to limit restraint conditions under which the present invention can be implemented and therefore have no technical significance. Any modification to the structure, change to the proportional relationship or adjustment on the size should fall within the scope of the technical content disclosed by the present invention without affecting the effects and the objectives that can be achieved by the present invention. The same reference numeral is used to indicate the same or similar elements in all of the accompanying drawings. The term "couple" or "connect" mentioned in the following embodiments may be any direct or indirect and wired or wireless connection means.

FIG. 1 is a block diagram of a radar detection system according to an embodiment of the present invention. Referring to FIG. 1, a radar detection system 100 includes a radar unit 105, a processing unit 103, and a pointing control unit 104. The radar unit 105 includes an antenna unit 101 and a front-end unit 102. The antenna unit 101 is configured to radiate a radio frequency signal to a free space. The radio frequency signal reflects a feedback signal when colliding with an object in the free space. The antenna unit 101 receives the feedback signal of the radio frequency signal. The front-end unit 102 is configured to generate the radio frequency signal, and demodulate and digitalize the feedback signal to obtain a digital feedback signal. The pointing control unit 104 is configured to adjust a field of view (FOV) direction of the radar unit 105 based on a control signal. The processing unit 103 is configured to receive the digital feedback signal, and send the control signal to the pointing control unit 104. The FOV direction of the radar unit 105 is a central direction of a detectable range of the radar unit 105.

In some embodiments of the present invention, the radio frequency signal is a continuous wave (CW) signal. In some embodiments of the present invention, the radio frequency signal is a frequency modulated continuous wave (FMCW) signal. In some embodiments of the present invention, the radio frequency signal is a CW signal having a fixed frequency.

Figure 2:
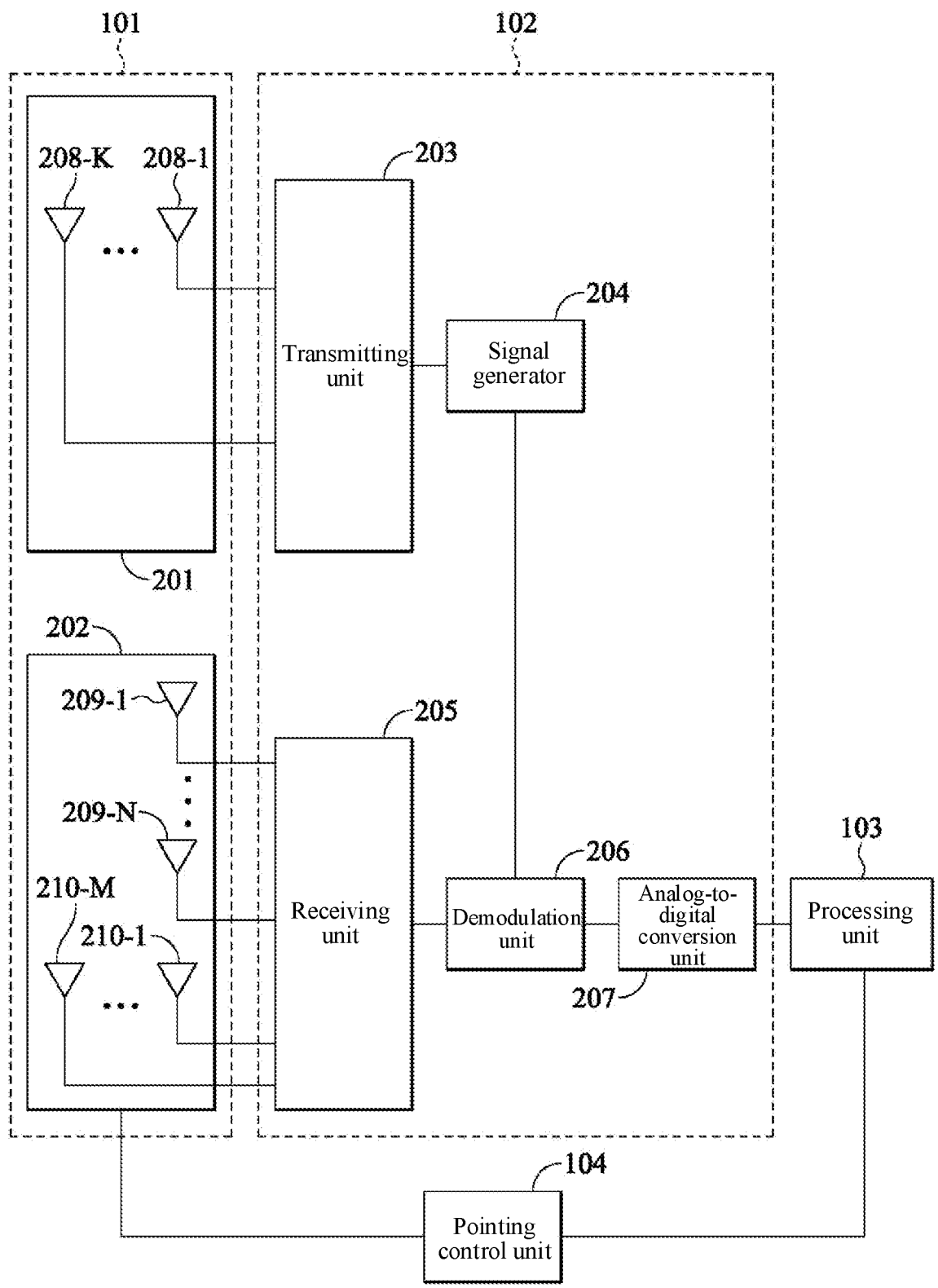
FIG. 2 is a schematic diagram of the radar detection system according to an embodiment of the present invention.

FIG. 2 is a schematic diagram of the radar detection system according to an embodiment of the present invention. Referring to FIG. 2, the antenna unit 101 further includes a transmitting antenna unit 201 and a receiving antenna unit 202. The transmitting antenna unit 201 includes a plurality of transmitting antennas 208-1 to 208-K. The transmitting antennas 208-1 to 208-K radiate the radio frequency signal to the free space. The receiving antenna unit 202 includes a plurality of receiving antennas 209-1 to 209-N and 210-1 to 210-M, to receive the feedback signal, where K, N, and M are positive integers, which represent quantities of the transmitting antennas 208-1 to 208-K and the receiving antennas 209-1 to 209-N and 210-1 to 210-M that are configured. Actual quantities of the transmitting antennas and the receiving antennas are determined according to requirements of the radar detection system 100, which are not limited in the present invention.

Generally, each of the transmitting antenna needs to designed according to a frequency, an FOV, and a purpose for transmitting a signal. The antenna may be designed as a lens antenna, a patch antenna, or a waveguide leaky-wave antenna. In some embodiments of the present invention, the transmitting antennas 208-1 to 208-K are patch antennas.

Generally, each of the receiving antenna needs to designed according to a frequency for receiving a signal. If a direction of an object is to be identified, a plurality of sets of receiving antennas are required. The receiving antenna generally includes a plurality of wave beams to receive echoes of the object from different azimuths, thereby determining an orientation of the object. The receiving antenna needs to be designed according to a frequency range of a to-be-received radio frequency signal and depending on whether a direction of a to-be-detected object needs to be identified. If so, a single input multiple output (SIMO) antenna design or a multiple input multiple output (MIMO) antenna design is required. In some embodiments of the present invention, the receiving antennas 209-1 to 209-N and 210-1 to 210-M are patch antennas. The antennas are implemented by using a printed circuit board.

The front-end unit 102 includes a signal generator 204, a transmitting unit 203, a receiving unit 205, a demodulation unit 206, and an analog-to-digital converter 207. The signal generator 204 generates the radio frequency signal, and transmits the radio frequency signal to the transmitting unit 203 and the demodulation unit 206. The transmitting unit 203 includes a power amplifier (PA). The PA is configured to amplify the radio frequency signal and transmit the amplified radio frequency signal to the transmitting antenna unit 201, so as to radiate the radio frequency signal to the free space.

The receiving unit 205 includes a signal amplifier and a filter, and is configured to receive a feedback signal received by the receiving antenna unit 101 and amplify and filter the received feedback signal. The demodulation unit 206 is coupled to the signal generator 204 and the receiving unit 205. The demodulation unit 206 receives the radio frequency signal generated by the signal generator 204 and the feedback signal amplified and filtered by the receiving unit 205, and demodulates the amplified and filtered feedback signal based on the radio frequency signal. The analog-to-digital converter 207 converts the demodulated feedback signal to a digital feedback signal and transmits the digital feedback to the processing unit 103 for follow-up signal processing.

In some embodiments of the present invention, the signal generator 204 generates a linear frequency modulated signal having a start frequency of 77 GHz, a stop frequency of 81 GHz, and a time cycle Tc of 40 µs. In some embodiments of the present invention, the signal generator 204 generates a linear frequency modulated signal having a start frequency of 24 GHz, a stop frequency of 28 GHz, and a time cycle Tc of 40 µs. A position or a speed of an object, or even a breath and a heartbeat of the object can be detected by using the linear frequency modulated signal by means of proper signal processing such as fast Fourier transform (FFT). In this embodiment, the demodulation unit 206 mixes and combines the frequency modulated signal generated by the signal generator 204 and the feedback signal amplified and filtered by the receiving unit 205, to generate an intermediate frequency (IF) signal. The analog-to-digital converter 207 converts the IF signal to a digital feedback signal and transmits the digital feedback signal to the processing unit 103 for follow-up signal processing, so as to obtain information included in the feedback signal.

In some embodiments of the present invention, the signal generator 204 generates a CW signal having a single frequency. The breath and the heartbeat of the object can be detected by using the CW signal having the single frequency by means of Doppler FFT. In addition, a direction of the object can be detected by using the foregoing plurality of transmitting antennas 208-1 to 208-K and the foregoing plurality of receiving antennas 209-1 to 209-N and 210-1 to 210-M.

In some embodiments of the present invention, the pointing control unit 104 includes a horizontal direction adjustment driving circuit, a vertical direction adjustment driving circuit, a horizontal direction adjustment mechanism, a vertical direction adjustment mechanism, and a pointing sensor. The pointing control unit 104 controls the FOV direction of the radar unit 105 for horizontal direction adjustment or/and vertical direction adjustment according to an instruction of the processing unit 103. The pointing control unit 104 drives the horizontal direction adjustment mechanism and the vertical direction adjustment mechanism by using the horizontal direction adjustment driving circuit and the vertical direction adjustment driving circuit, to control the FOV direction of the radar unit 105. The horizontal direction adjustment mechanism and the vertical direction adjustment mechanism include motors and related mechanisms and electronic motor components. The motors may be stepping motors or servo motors, which are not limited in the present invention. The pointing sensor reports the FOV direction of the radar unit 105 back. In this embodiment, the pointing sensor expresses the FOV direction of the radar unit 105 as a combination of a horizontal direction angle and a vertical direction angle. The pointing control unit 104 determines, according to the combination of a horizontal direction angle and a vertical direction angle, whether a pointing instruction of the processing unit 103 is completed. In addition, it is worth noting that, if the FOV direction of the radar unit 105 is horizontally ±60° and vertically ±60°, the pointing control unit 104 needs to adjust the FOV direction of the radar unit 105 by horizontally ±30° and vertically ±30° to expand the FOV of the radar unit 105 to horizontally ±90° and vertically ±90°.

It is to be noted that, since the pointing control unit 104 can control the FOV direction of the radar unit 105, a detectable range of the radar unit 105 is enlarged. In the present invention, a contemporary FOV of the radar unit 105 is referred to as a current FOV. A detection range that can be achieved by controlling the FOV direction of the radar unit 105 is referred to as a total FOV. For example, the FOV of the radar unit 105 is horizontally ±60° and vertically ±60°, and the FOV of the radar unit 105 is expanded to horizontally ±90° and vertically ±90° by controlling the FOV direction of the radar unit 105. Therefore, a total FOV of the radar unit 105 is horizontally ±90° and vertically ±90°. A current FOV of the radar unit 105 is horizontally ±60° and vertically ±60°. Another current FOV of the radar unit 105 is horizontally ±60° and vertically −30° to 90°.

Figure 3:
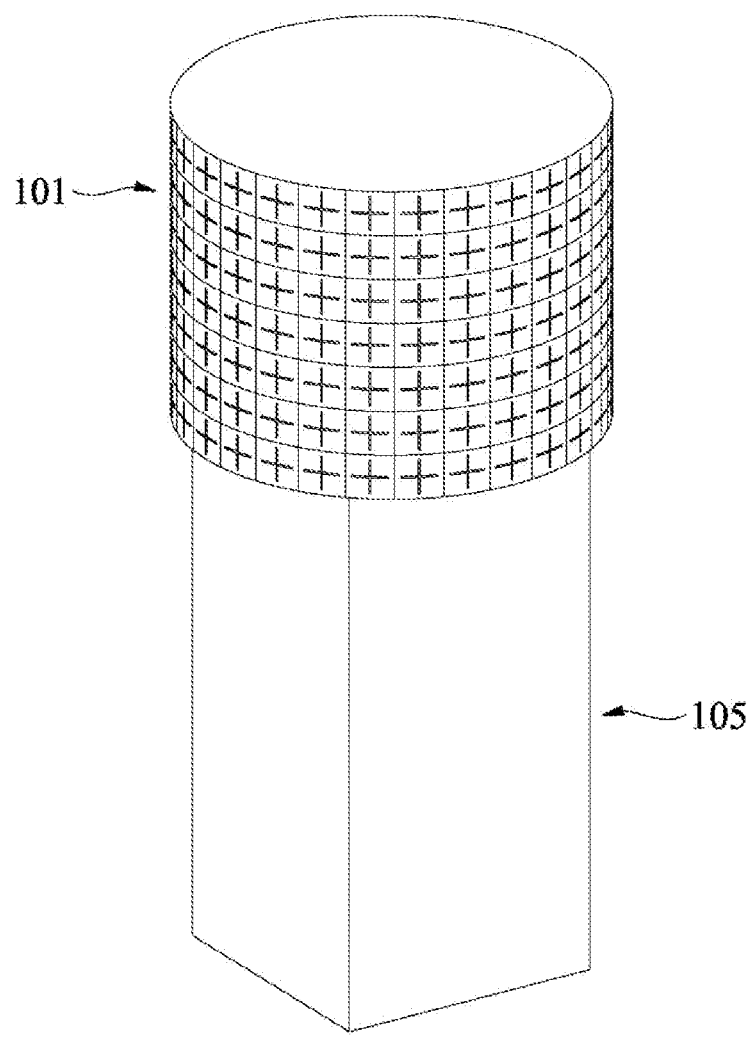
FIG. 3 is a schematic diagram of the radar detection system according to an embodiment of the present invention.
Figures 2, 4:
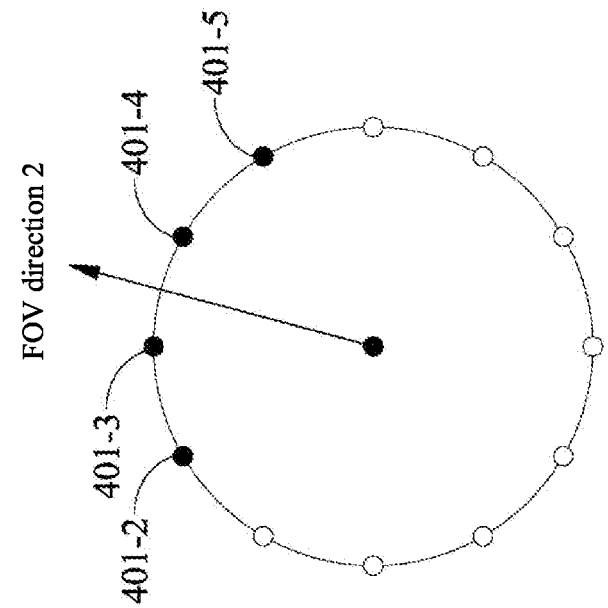
Figures 1, 4:
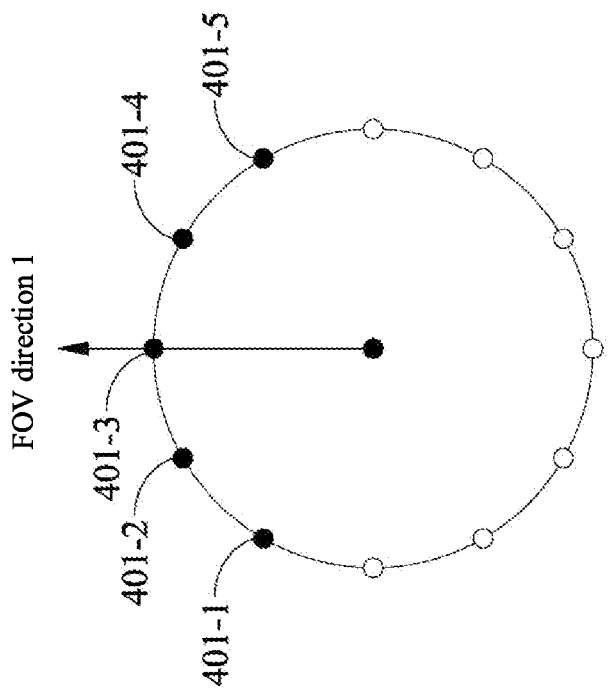

FIG. 3 is a schematic diagram of the radar detection system according to an embodiment of the present invention. FIG. 4-1 and FIG. 4-2 are schematic diagrams of FOV direction adjustment according to an embodiment of the present invention. Refer to FIG. 3, FIG. 4-1, and FIG. 4-2. As shown in FIG. 3, the radar unit 105 includes antenna arrays in a plurality of directions (for example, four directions, six directions, or eight directions). The antenna unit 101 includes a plurality of surrounding antenna arrays in a ring shape (shown in FIG. 3). In the structure shown in FIG. 3, the pointing control unit 104 can adjust the FOV direction of the radar unit 105 merely by selectively switching to an antenna array corresponding to a required FOV. Since the structure shown in FIG. 3 does not require an electromechanical driving structure, the FOV direction of the radar unit 105 can be rapidly adjusted. As shown in FIG. 4-1 and FIG. 4-2, when the pointing control unit 104 selects the antenna arrays 401-1 to 401-5, the FOV direction of the radar unit 105 is an FOV direction 1. When the pointing control unit 104 selects the antenna arrays 401-2 to 401-5, the FOV direction of the radar unit 105 is an FOV direction 2.

Figure 6:
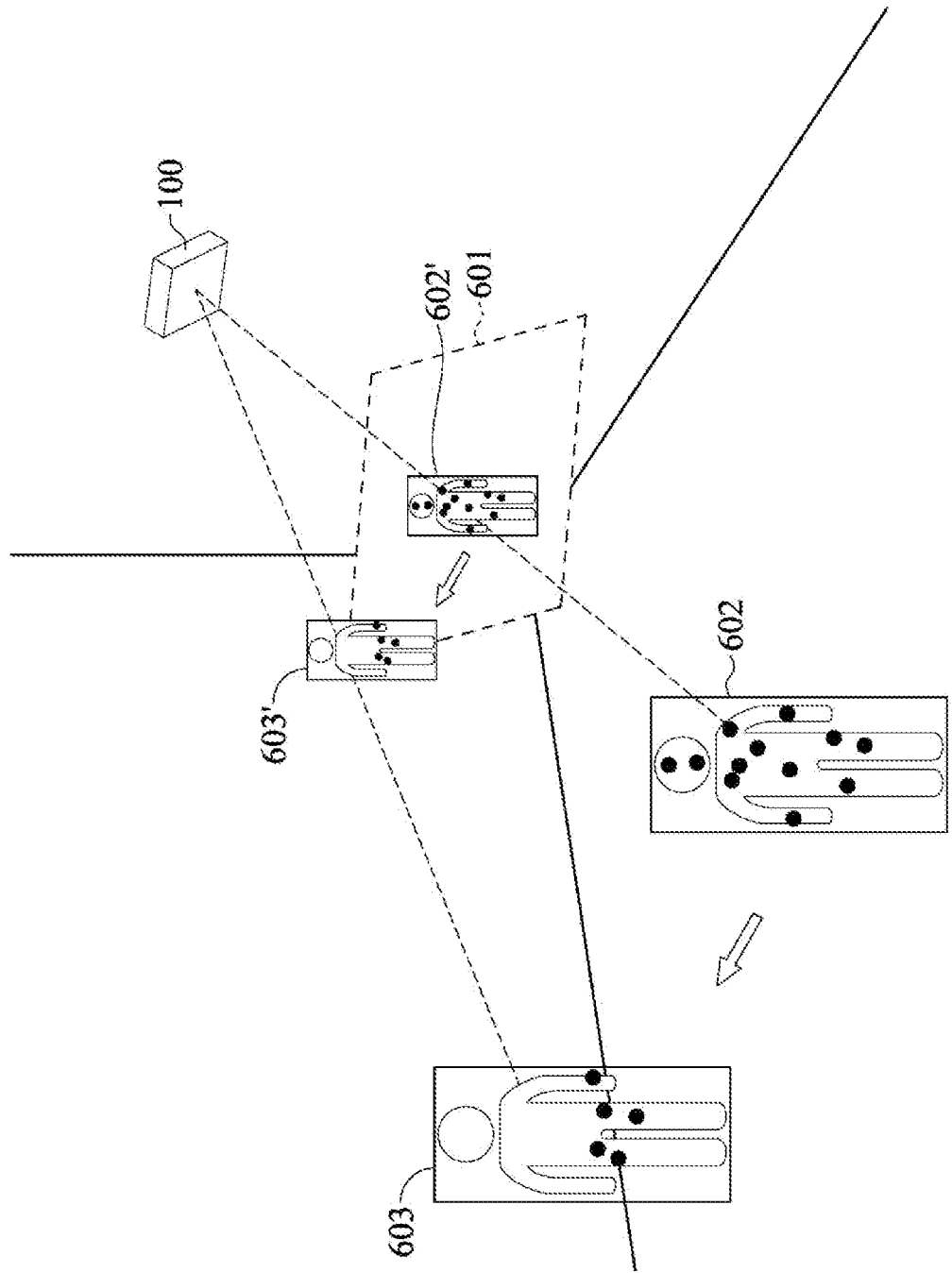
FIG. 6 is a schematic diagram of a current FOV and image coordinates according to an embodiment of the present invention.
Figure 7:
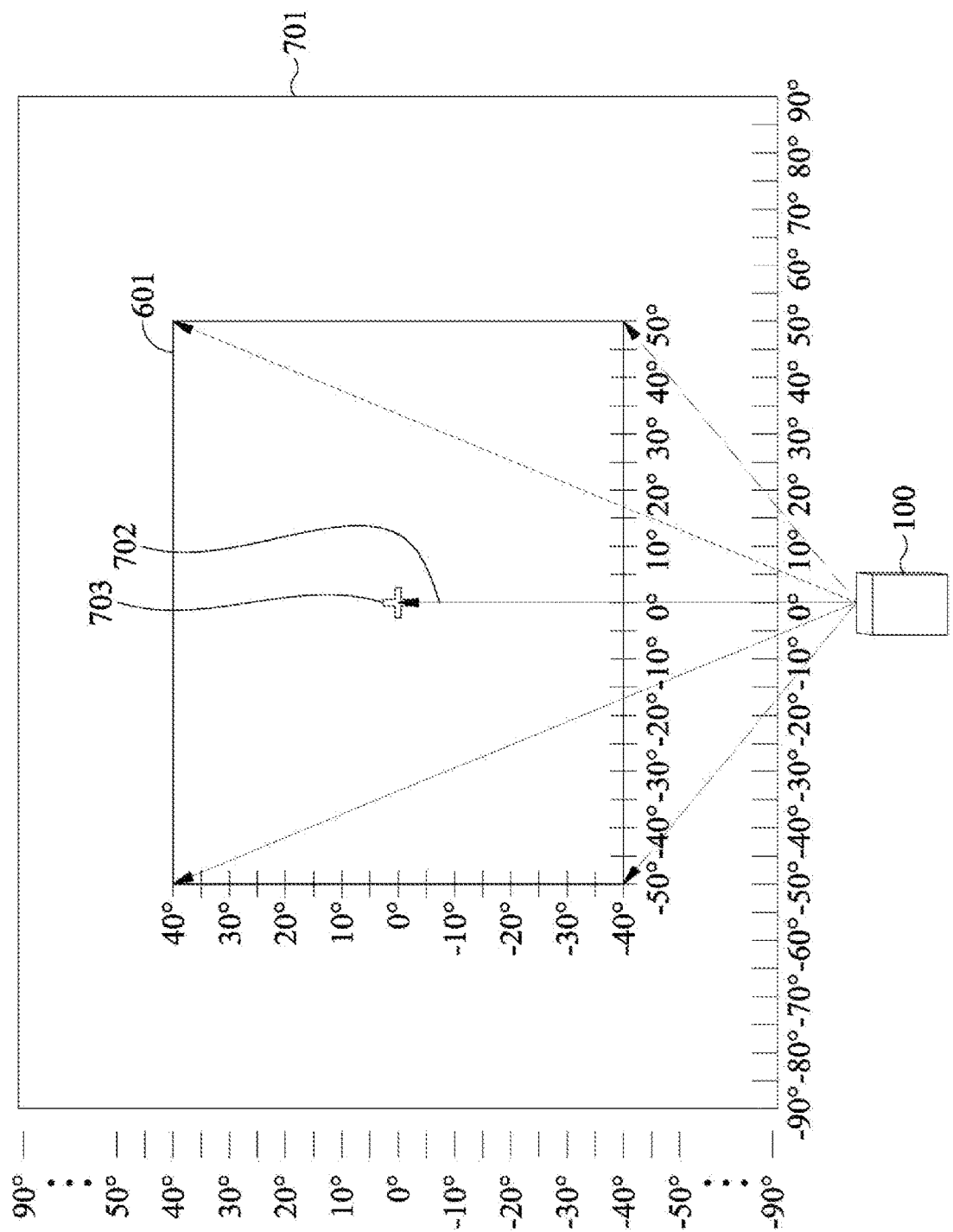
FIG. 7 is a schematic diagram of a current FOV, a total FOV, and image coordinates according to an embodiment of the present invention.
Figure 8:
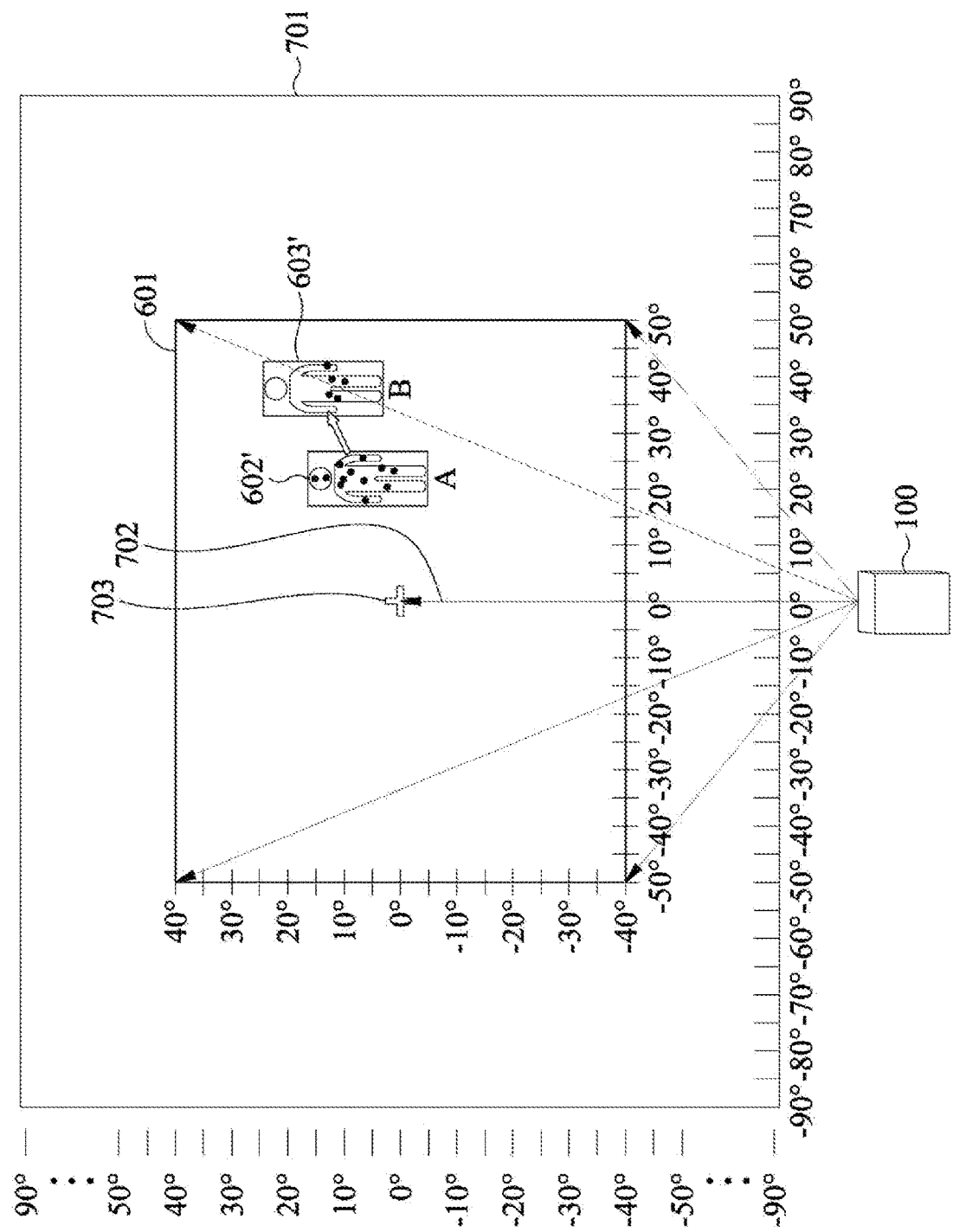
FIG. 8 is a schematic diagram of the current FOV, the total FOV, and the image coordinates according to an embodiment of the present invention.

FIG. 6 is a schematic diagram of a current FOV and image coordinates according to an embodiment of the present invention. FIG. 7 is a schematic diagram of the current FOV, the total FOV, and the image coordinates according to an embodiment of the present invention. FIG. 8 is a schematic diagram of the current FOV, the total FOV, and the image coordinates according to an embodiment of the present invention. Referring to FIG. 6, FIG. 7, and FIG. 8, by projecting an object (an object 602) detected in the current FOV of the radar unit 105 of the radar detection system 100 onto a plane 601 (an object projection 602') corresponding to the current FOV, a two-dimensional coordinate system can be generated for the object detected in the current FOV of the radar unit 105. The two-dimensional coordinate system is referred to as a current FOV coordinate system. For example, in FIG. 7, the plane 601 corresponding to the corresponding current FOV can define a two-dimensional coordinate system by using angles. A first-dimensional coordinate is a horizontal angle ranging from −50° to +50°. A second-dimensional coordinate is a vertical angle ranging from −40° to +40°. An FOV direction 702 corresponds to an original point 703 of the current FOV coordinate system.

As shown in FIG. 7, the total FOV obtained by controlling the FOV direction of the radar unit 105 may define a corresponding total FOV coordinate system 701 by using angles. A first-dimensional coordinate of the total FOV coordinate system 701 is a horizontal angle ranging from −90° to +90°. A second-dimensional coordinate is a vertical angle ranging from −90° to +90°. As long as a coordinate position of the central point 703 of the plane 601 corresponding to the current FOV in the total FOV coordinate system 701, the current FOV coordinate system and the total FOV coordinate system 701 can be easily converted.

A radar FOV direction adjustment method and cooperation between modules of the radar detection system 100 according to some embodiments of the present invention are described in detail below with reference to the drawings.

Figures 1, 12:
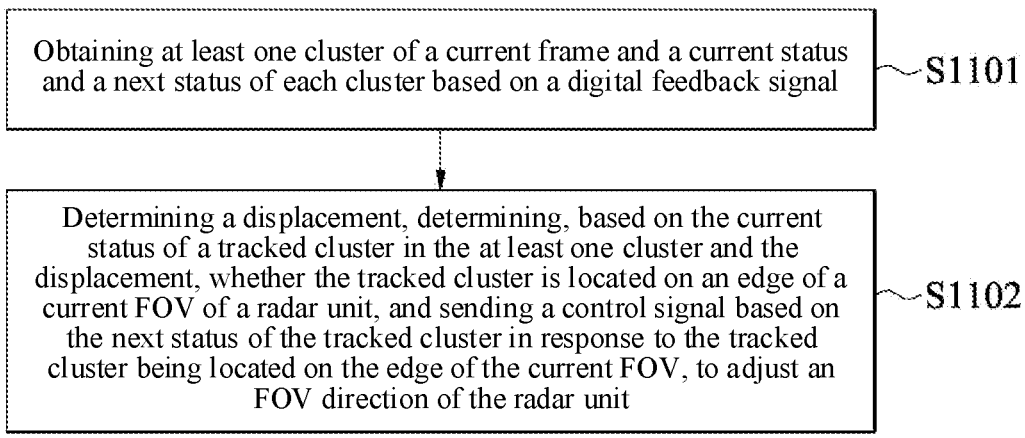
Figures 2, 12:
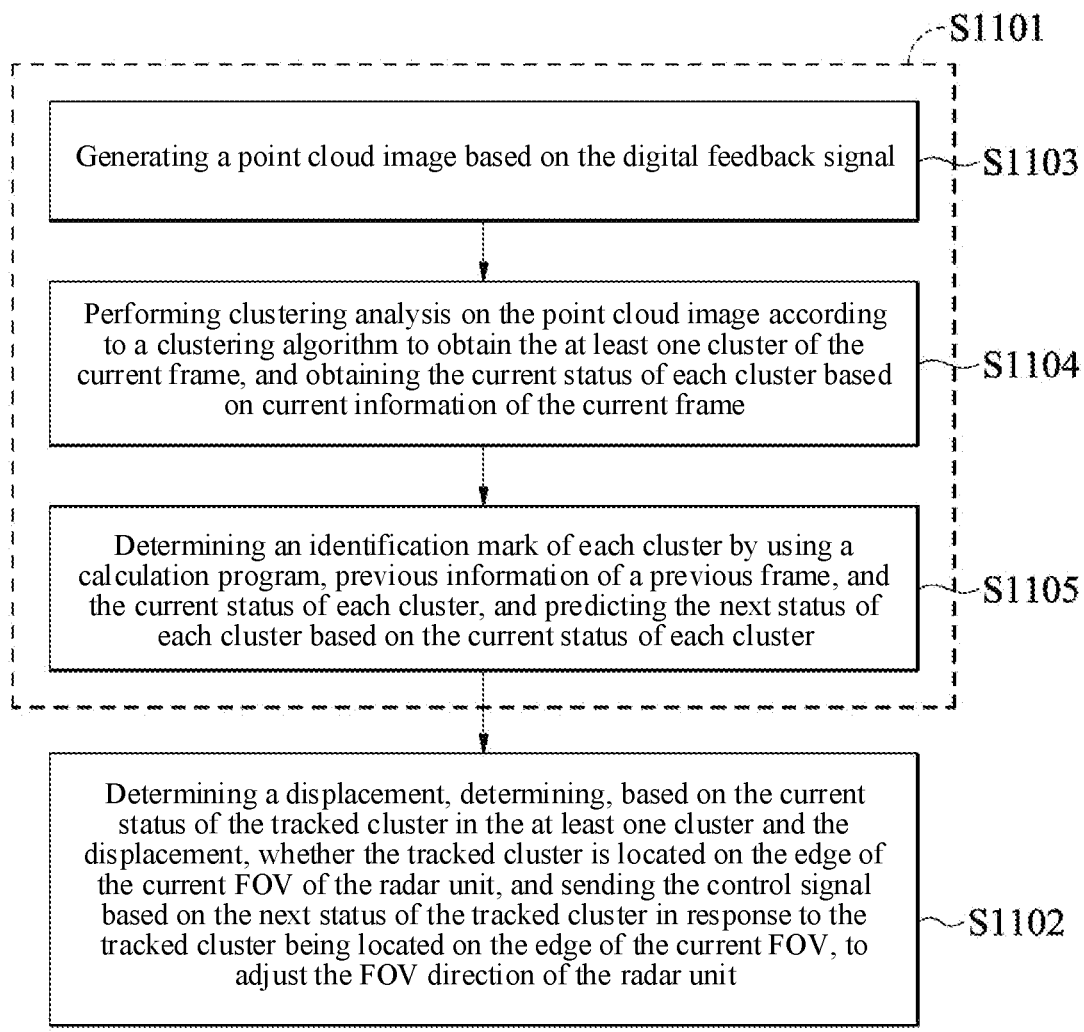

FIG. 5-1, FIG. 5-2, and FIG. 5-3 are schematic operation diagrams of the radar detection system 100 according to some embodiments of the present invention. FIG. 12-1 is a flowchart of a radar FOV direction adjustment method according to some embodiments of the present invention. Referring FIG. 5-1, FIG. 5-2, FIG. 5-3, and FIG. 12-1, the radar detection system 100 periodically radiates a radio frequency signal to scan a detection area (a detection area 504 in FIG. 5-1) and obtains a feedback signal. The radio frequency signal is the foregoing linear frequency modulated signal. In response to the foregoing periodical scanning, the processing unit 103 performs steps S1101 to S1102 in one scanning round. In step S1101, the processing unit 103 obtains at least one cluster of a current frame and a current status and a next status of each cluster based on a digital feedback signal. In step S1102, the processing unit 103 determines a displacement, and determines, based on the current status of a tracked cluster in the at least one cluster of the current frame corresponding to a to-be-tracked target and the displacement, whether the tracked cluster is located on an edge of a current FOV of the radar unit 105. The processing unit 103 sends a control signal to the pointing control unit 104 based on the next status of the tracked cluster in response to the tracked cluster being located on the edge of the current FOV, to adjust the FOV direction of the radar unit 105.

FIG. 12-2 is a flowchart of the radar FOV direction adjustment method according to some embodiments of the present invention. Referring to FIG. 12-2, in an embodiment shown in FIG. 12-2, step S1101 further includes steps S1103 to S1105. In step S1103, the processing unit 103 obtains a current frame signal based on the foregoing digital feedback signal, and generates a point cloud image 500 according to the current frame signal. The point cloud image 500 includes a plurality of points 501. In step S1104, the processing unit 103 performs clustering analysis on the point cloud image 500 according to a clustering algorithm to classify the plurality of points 501 into the at least one cluster corresponding to the current frame. In the embodiment shown in FIG. 5-1 to FIG. 5-3, the processing unit 103 classifies the foregoing plurality of points 501 into a cluster 502 and a cluster 503 that correspond to the current frame. The processing unit 103 obtains the current status of each cluster according to current information of the current frame.

In order to identify a target, the processing unit 103 maintains and tracks each cluster of each frame. Starting from a first frame, the processing unit 103 provides an identification mark (the identification mark may be a number, such as 1, 2, 3, . . . ) for each cluster detected for the first frame, and calculates a current status of each cluster. Each cluster detected by the first frame is recorded as a tracked object. The processing unit 103 further determines a tracked cluster corresponding to a to-be-tracked target (for example, an attendee) according to the current status of the first frame.

After a second frame is transmitted, the processing unit 103 obtains at least one cluster and a status of the second frame. The processing unit 103 attempts to associate each cluster of the second frame with each tracked object of the first frame having an identification mark based on previous information of the first frame about each tracked object (that is, each cluster of the first frame) and the current status of each cluster of the second frame. If a cluster of the second frame can be associated with the tracked object of the first frame, the identification mark of the associated tracked object of the first frame is used as an identification mark of the corresponding cluster of the second frame. If the cluster of the second frame cannot be associated with any tracked object of the first frame, the processing unit 103 provides a new number to the cluster of the second frame as the identification mark of the cluster, and records the cluster of the second frame as a new tracked object, and so on.

If a tracked object having an identification mark is not detected in preset D continuous frames, the processing unit 103 marks a cluster having the identification mark as inactive, and no longer attempts to pair a cluster of a newly transmitted frame.

Figures 1, 5:
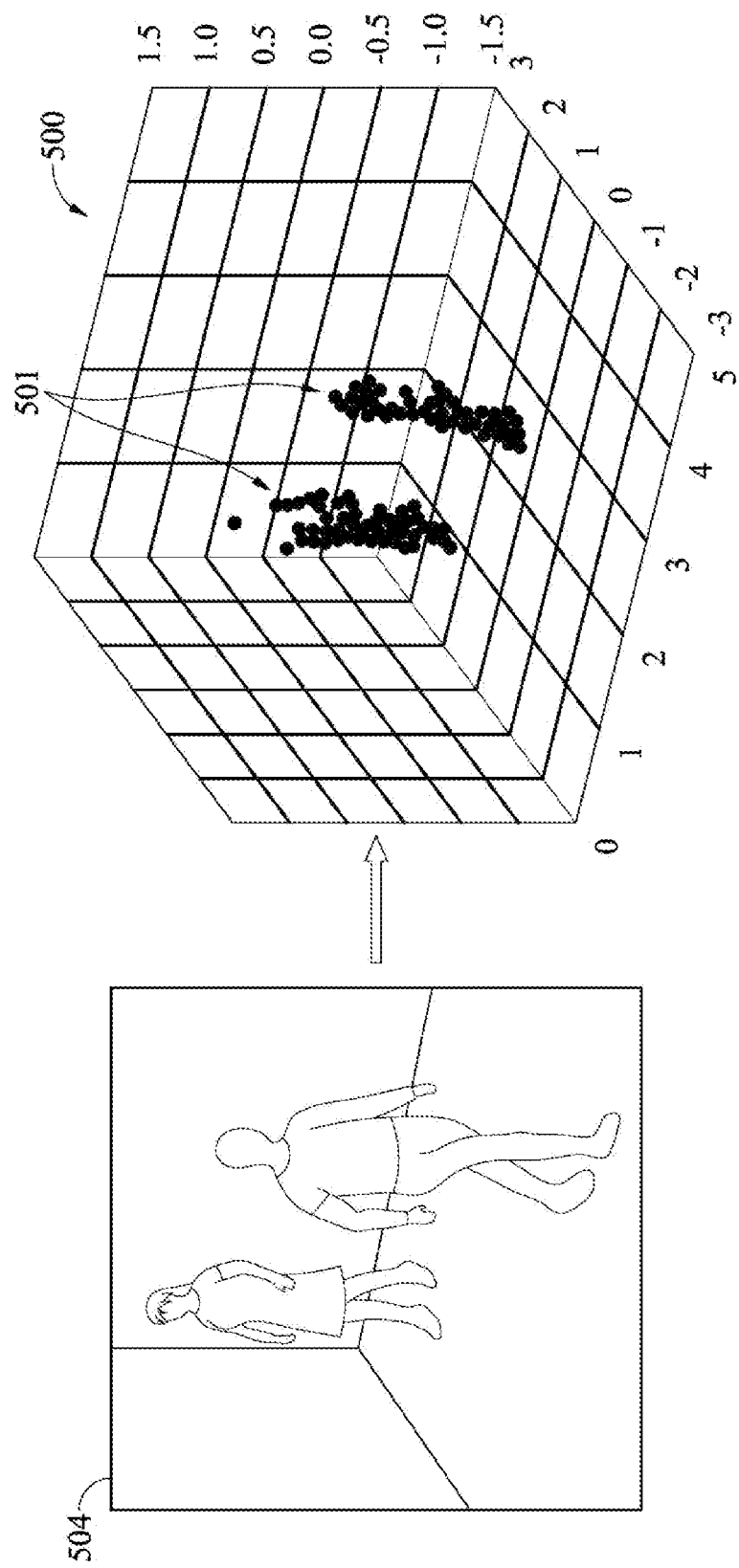
Figures 2, 5:
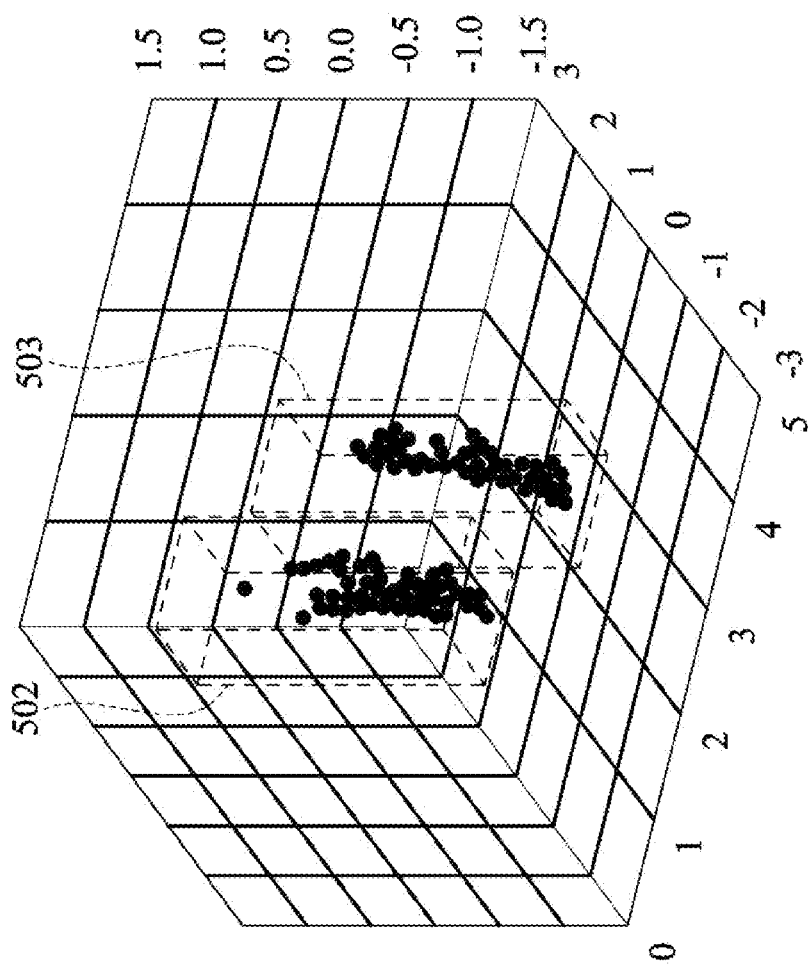
Figures 3, 5:
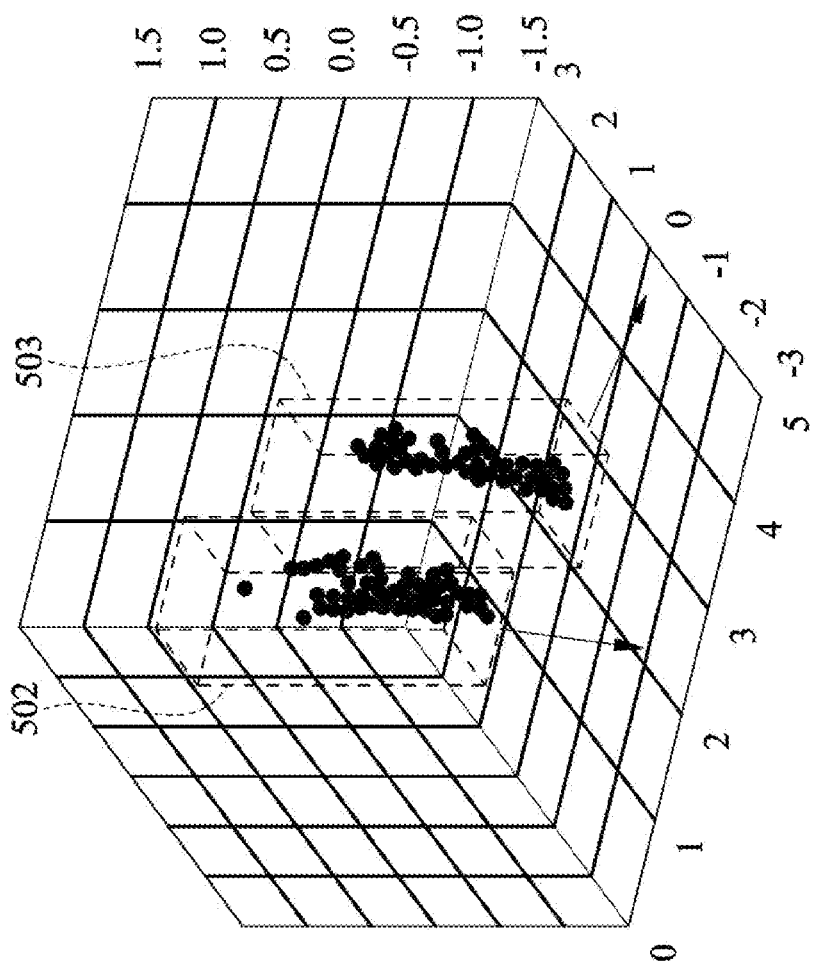

Therefore, in step S1105, the processing unit 103 determine the identification mark of each cluster of the current frame by using a calculation program, previous information of a previous frame, and the current status of each cluster of the current frame. The processing unit 103 predicts the next status of each cluster of the current frame based on the current status of each cluster of the current frame. In some embodiments of the present invention, the next status of each cluster includes a next position of each cluster, as shown in FIG. 5-3.

Figure 13:
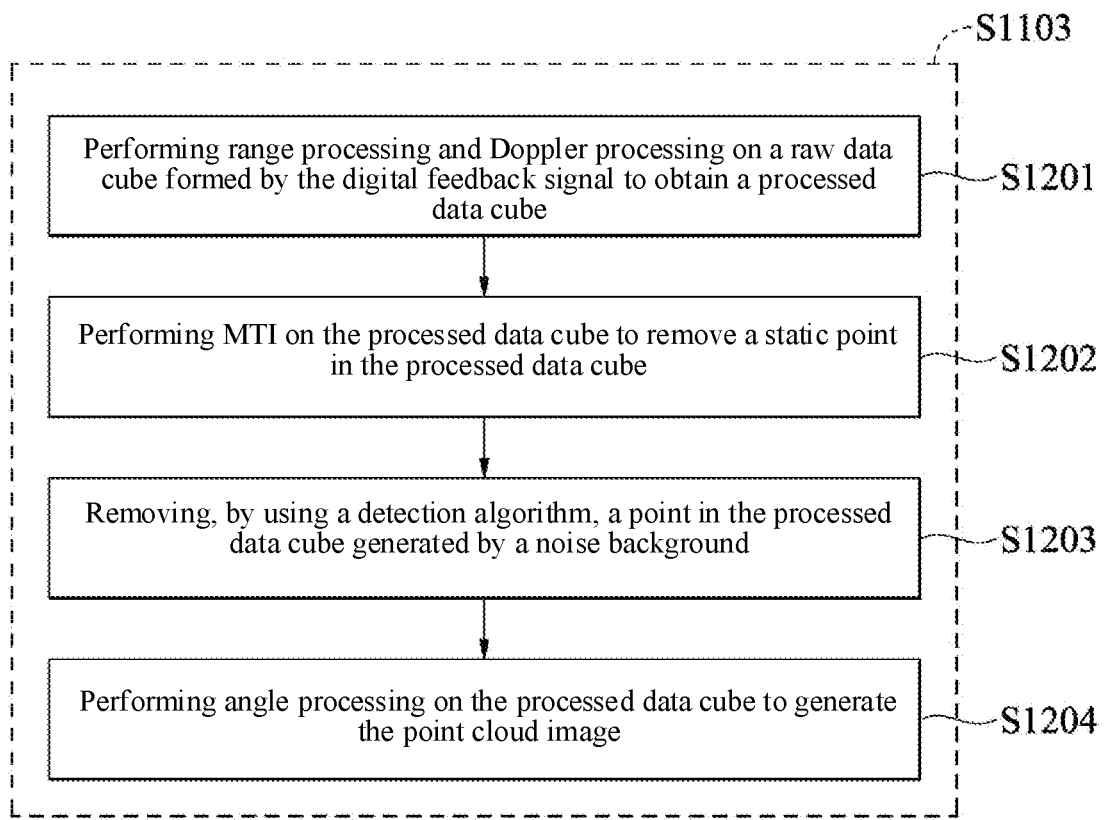
FIG. 13 is a flowchart of generating a point cloud image according to an embodiment of the present invention.

FIG. 13 is a flowchart of generating a point cloud image according to an embodiment of the present invention. In this embodiment, the radio frequency signal is the foregoing linear frequency modulated signal. As shown in FIG. 13, step S1103 further includes step S1201 to step S1204. In step S1201, the processing unit 103 performs range processing and Doppler processing on a raw data cube formed by the digital feedback signal, to obtain a processed data cube. The range processing includes range FFT. The Doppler processing includes Doppler FFT. As described above, the demodulation unit 206 mixes and combines the frequency modulated signal generated by the signal generator 204 and the feedback signal amplified and filtered by the receiving unit 205, to generate an IF signal. In order to detect objects in different ranges (distances), FFT is performed on the IF signal. Each peak value after the processing represents an object at a corresponding distance. This is referred to as range FFT. For a target of interest, range FFT may be repeatedly performed, until enough data is available to perform secondary FTT. A result of the secondary FTT is a two-dimensional complex-valued matrix. A peak value of the two-dimensional complex-valued matrix corresponds to a Doppler frequency displacement of a moving target. This is referred to as Doppler FFT.

In step S1202, the processing unit 103 performs moving target indication (MTI) on the processed data cube to remove a static point in the processed data cube. In step S1203, after step S1202, the processing unit 103 removes, by using a detection algorithm, a point in the processed data cube generated by a noise background.

It is worth noting that, in some embodiments of the present invention, the foregoing detection algorithm is a constant false alarm rate (CFAR) algorithm. In other embodiments of the present invention, the detection algorithm is selected from a group consisting of a cell-averaging CFAR (CA-CFAR) algorithm, a greatest-of-cell-average CFAR (GOCA-CFAR) algorithm, a smallest-of-cell-average CFAR (SOCA-CFAR) algorithm, and an ordered statistic CFAR (OS-CFAR) algorithm.

In step S1204, after step S1203, angle processing is performed on the processed data cube to generate the point cloud image 500 shown in FIG. 5-1. The angle processing includes angle FFT. When two objects at a same distance to the radar detection system 100 and having a same speed exist, the range FFT and the Doppler FFT are ineffective. In this case, an angle of arrival (AoA) is required to be estimated. Since a distance between the object and each antenna is different, the estimation of the AoA is based on a phasor change in the peak value of the range FFT or the Doppler FFT, and requires at least two receiving antennas. Likewise, problems related to the AoA estimation may be resolved by performing FFT on a phasor sequence corresponding to a peak value of two-dimensional FFT (including the range FFT and the Doppler FFT). This is referred to as angle FFT.

In some embodiments of the present invention, the clustering algorithm in step S1104 is density-based spatial clustering of applications with noise (DBSCAN). In some embodiments of the present invention, metric based on the DBSCAN is expressed as an equation 1 below, to reduce contribution of a vertical z axis (a vertical axis) in the clustering:

$$D(p,q)=(p_x-q_x)^2+(p_y-g_y)^2+\alpha*(p_z-q_z)^2 \quad \text{(Equation 1).}$$

α is a real value less than 1, $p_x$ and $q_x$ are respectively x coordinates of p and q, $p_y$ and $q_y$ are respectively y coordinates of p and q, and $p_z$ and $q_z$ are respectively z coordinates of p and q.

In some embodiments of the present invention, a is selected as 0.05. In some embodiments of the present invention, a is selected as 0.25.

In some embodiments of the present invention, the clustering algorithm is selected as peak grouping, modified DBSCAN, or hierarchical DBSCAN (HDBSCAN).

In some embodiments of the present invention, the current status of each cluster of the current frame in step S1104 includes a position of the cluster. The position of each cluster is determined by a physical center of the cluster. In some embodiments of the present invention, the physical center of the cluster is a centroid of a plurality of corresponding point clouds of the cluster. In some embodiments of the present invention, as shown in FIG. 5-2, each cluster includes an outer frame. The processing unit 103 determines the position of the current status of each cluster by using a central point of the outer frame of each cluster as the physical center of each cluster.

In some embodiments of the present invention, the outer frame is in a rectangular shape. In some embodiments of the present invention, the outer frame is in a circular shape. In some embodiments of the present invention, the outer frame is in an oval shape.

It is worth noting that, the radar detection system 100 periodically radiates the linear frequency modulated signal to scan the detection area (the detection area 504 in FIG. 5-1) and obtain the feedback signal. The radar detection system 100 may alternatively scan the detection area (the detection area 504 in FIG. 5-1) by using a CW signal having a fixed frequency, to obtain the feedback signal. In this case, the processing unit 103 performs Doppler processing and angle processing on the raw data cube formed by the digital feedback signal, to generate a two-dimensional point cloud image. The processing unit 103 performs clustering analysis on the two-dimensional point cloud image according to a clustering algorithm, to classify points in the two-dimensional point cloud image into at least one cluster corresponding to the current frame.

Figure 14:
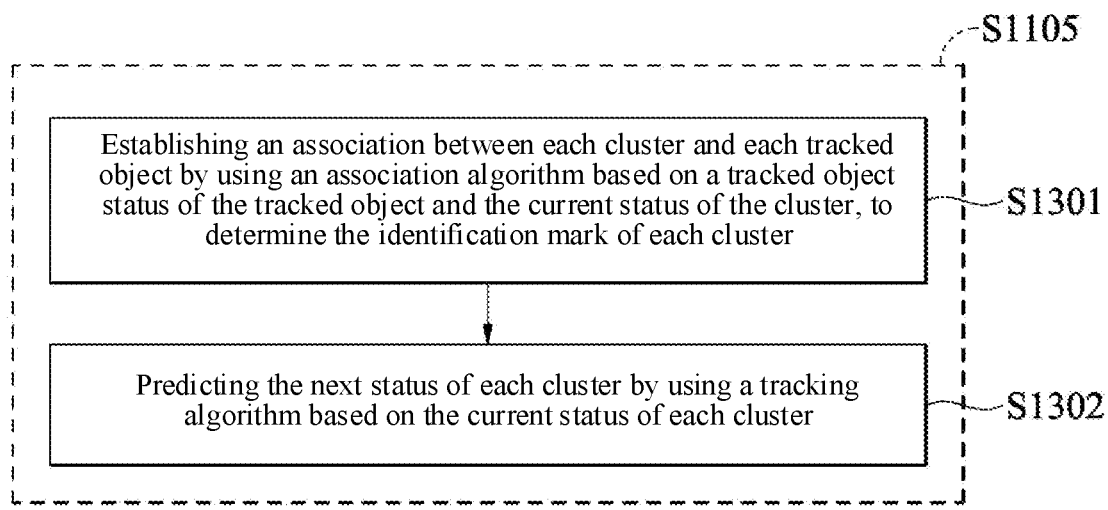
FIG. 14 is a flowchart of the radar FOV direction adjustment method according to some embodiments of the present invention.

FIG. 14 is a flowchart of the radar FOV direction adjustment method according to some embodiments of the present invention. Referring to FIG. 14, in the embodiment shown in FIG. 12, the processing unit 103 maintains a group of tracked objects based on a transmitted frame. Each tracked object has an identification mark. In the embodiment shown in FIG. 14, the calculation program in step S1105 includes an association algorithm and a tracking algorithm. The previous information of the foregoing previous frame includes a tracked object status of each tracked object. The current status of each cluster of the current frame includes the position of each cluster. The tracked object status of each tracked object includes a position of an individual tracked object. Step S1105 includes step S1301 and step S1302. In step S1301, the processing unit 103 establishes an association between each cluster and each tracked object by using the foregoing association algorithm based on the position of each tracked object and the position of each cluster, to determine the identification mark of each cluster.

In some embodiments of the present invention, the association algorithm is a Hungarian algorithm. The processing unit 103 establish the association between each cluster of the current frame and each tracked object by using the Hungarian algorithm. The processing unit 103 establishes a cost matrix for each cluster and each tracked object of the current frame, and minimizes a combined distance loss to allocate each cluster of the current frame to each tracked object. It is to be noted that, the cost matrix may be a non-square matrix. This is because a quantity of the tracked objects may be different from a quantity of the clusters of the current frame. An element $M_{i,j}$ of the cost matrix is set as a distance between a tracked object i and a cluster j of the current frame. If a value of $M_{i,j}$ exceeds a threshold, the processing unit 103 sets $M_{i,j}$ to a large real value L to avoid association.

After the processing unit 103 establishes the association between each cluster and each tracked object of the current frame, in step S1302, the processing unit 103 predicts a next position of each cluster by using a tracking algorithm based on the position of each cluster. In this embodiment, the tracking algorithm is a Kalman filter.

Figure 15:
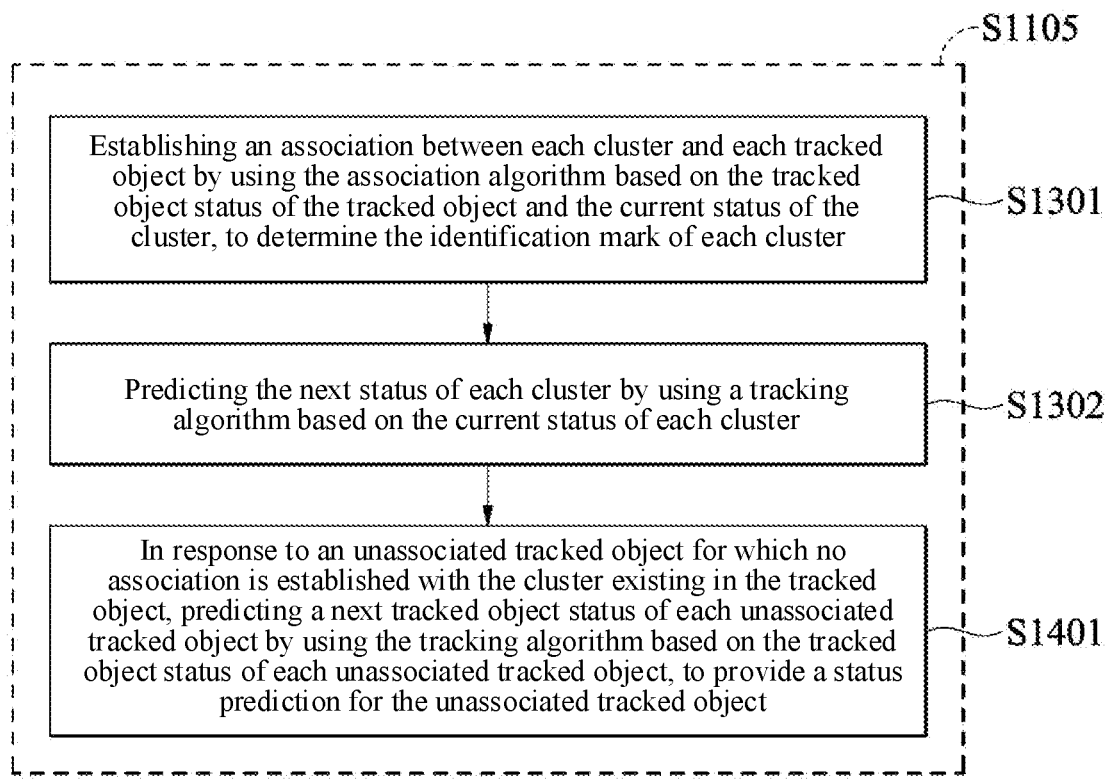
FIG. 15 is a flowchart of the radar FOV direction adjustment method according to some embodiments of the present invention.

FIG. 15 is a flowchart of the radar FOV direction adjustment method according to some embodiments of the present invention. Referring to FIG. 15, after step S1302, step S1105 further includes step S1401. In step S1401, if an unassociated tracked object for which no association is established with all of the clusters of the current frame exists in the tracked objects, the processing unit 103 predicts a next position of each unassociated tracked object by using the foregoing Kalman filter based on a position of each unassociated tracked object, to provide a position prediction for each unassociated tracked object.

It is worth noting that, in the foregoing embodiment, the processing unit 103 uses the Kalman filter as the tracking algorithm. In some embodiments of the present invention, the foregoing tracking algorithm may alternatively be an extended Kalman filter (EKF), an unscented Kalman filter, an interacting multiple model (IMM) algorithm, or a probability hypothesis density filter, which is not limited in the present invention.

In addition, it is worth noting that, in the foregoing embodiment, the processing unit 103 uses the Hungarian algorithm as the association algorithm. In some embodiments of the present invention, the foregoing association algorithm may alternatively be global nearest neighbor (GNN), a probabilistic data association filter, or a joint probabilistic data association filter, which is not limited in the present invention.

Figure 16:
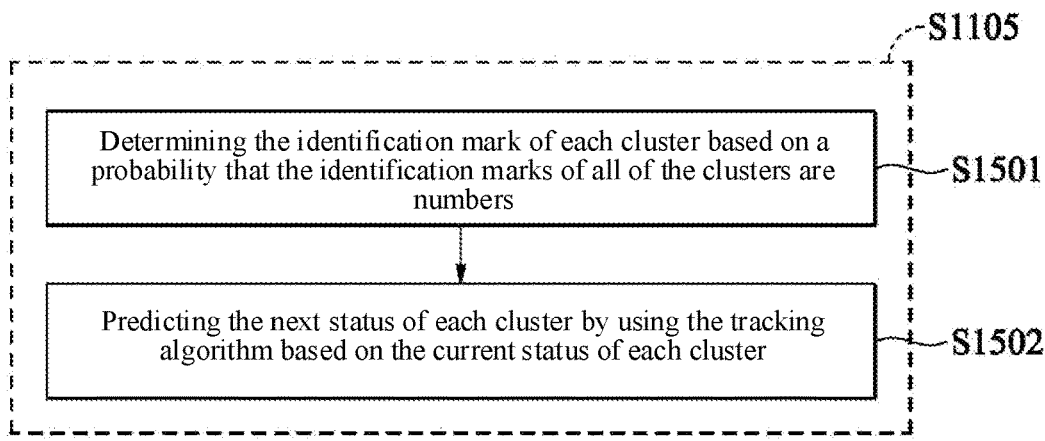
FIG. 16 is a flowchart of the radar FOV direction adjustment method according to some embodiments of the present invention.

FIG. 16 is a flowchart of the radar FOV direction adjustment method according to some embodiments of the present invention. Referring to FIG. 16, the calculation program in step S1105 includes a probability calculation program and a tracking algorithm. The current status of each cluster includes a status component. The previous information of the previous frame includes a probability distribution related to the current status of the status component and the identification mark of each cluster. In this embodiment, the status component is the position of the cluster. The previous information of the previous frame includes a probability $P_i(s)$ of each tracked object appearing at each coordinate, where i is a numerical number of the identification mark. For example, $P_1(s)$ represents a probability that a tracked object having an identification mark of 1 appears at each current coordinate, and $P_2(s)$ represents a probability that a tracked object having an identification mark of 2 appears at each current coordinate.

The foregoing probability calculation program includes calculating, according to the foregoing probability distribution and the position of each cluster, a probability that the identification mark of each cluster is a number. Step S1105 includes step S1501 and step S1502. In step S1501, the processing unit 103 determines the identification mark of each cluster based on the probabilities that the identification marks of all of the clusters are numbers. For example, a position of a cluster A is x. In this case, the processing unit 103 may estimate a probability that the cluster A is a tracked object having a mark of 1 as $P_1(x)$, and estimate a probability that the cluster A is a tracked object having a mark of 2 as $P_2(x)$. The processing unit 103 compares $P_1(x)$ with $P_2(x)$. If $P_1(x)$ is greater than or equal to $P_2(x)$, the processing unit 103 determines that the cluster A is the tracked object having the mark of 1, or otherwise, the processing unit 103 determines that the cluster A is the tracked object having the mark of 2, and so on.

In step S1502, the processing unit 103 predicts the next status of each cluster based on the current status (including the position) of each cluster by using the Kalman filter as the tracking algorithm, and continues to update the foregoing probability distribution.

As described above, the processing unit 103 may alternatively use the EKF, the unscented Kalman filter, the IMM algorithm, or the probability hypothesis density filter as the tracking algorithm, which is not limited in the present invention.

Figure 17:
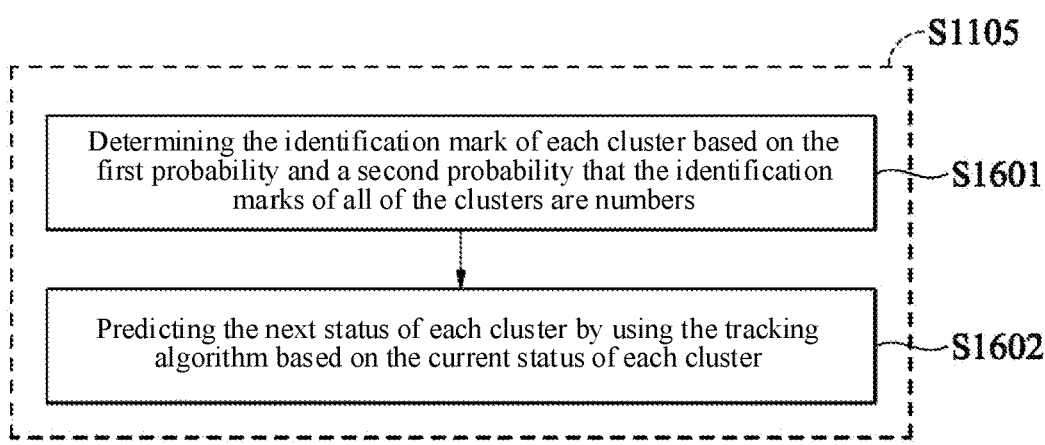
FIG. 17 is a flowchart of the radar FOV direction adjustment method according to some embodiments of the present invention.

In an embodiment of the present invention, the identification mark of the cluster is determined by using both the position and the physiological characteristic of the cluster. FIG. 17 is a flowchart of the radar FOV direction adjustment method according to some embodiments of the present invention. Referring to FIG. 17, the calculation program in step S1105 includes a probability calculation program and a tracking algorithm. The current status of each cluster includes the position and the physiological characteristic. The physiological characteristic is a heart rate. The previous information of the previous frame includes a first probability distribution related to the position and the identification mark of each cluster and a second probability distribution related to the heart rate and the identification mark of each cluster.

In this embodiment, the previous information of the previous frame includes a probability $PP_i(s)$ of each tracked object appearing at each coordinate. A probability that each tracked object has a current heart rate of u is $PH_i(u)$, where u is a value of the heart rate, and i is a number of the identification mark. For example, $PP_i(s)$ represents the probability that the tracked object having the identification mark of 1 appears at each current coordinate, and $PP_2(s)$ represents the probability that the tracked object having the identification mark of 2 appears at each current coordinate. $PH_i(u)$ represents the probability that the tracked object having the identification mark of 1 has the current heart rate of u.

In this embodiment, the foregoing probability calculation program includes calculating, according to the first probability distribution and the position of each cluster, a first probability that the identification mark of each cluster is a specific number and calculating, according to the second probability distribution and the heart rate of each cluster, a second probability that the identification mark of each cluster is the specific number. Step S1105 includes step S1601 and step S1602. In step S1601, the processing unit 103 determines the identification mark of each cluster based on the first probability and the second probability that the identification marks of all of the clusters are a specific number. For example, a position of a cluster A is x and a heart rate is y. In this case, the processing unit 103 may estimate a probability that the cluster A is a tracked object having a mark of 1 as $PP_1(x)$, and estimate a probability that the cluster A is a tracked object having a mark of 2 as $PP_2(x)$, based on the position. The processing unit 103 may estimate the probability that the cluster A is the tracked object having the mark of 1 as $PH_1(y)$, and estimate the probability that the cluster A is the tracked object having the mark of 2 as $PH_2(y)$, based on the heart rate. In this embodiment, the processing unit 103 compares $aPP_1(x)+bPH_1(y)$ with $aPP_2(x)+bPH_2(y)$, where a and b are two predetermined positive real numbers.

If $aPP_1(x)+bPH_1(y)$ is greater than or equal to $aPP_2(x)+bPH_2(y)$, the processing unit 103 determines that the cluster A is the tracked object having the mark of 1, or otherwise, the processing unit 103 determines that the cluster A is the tracked object having the mark of 2, and so on.

In step S1602, the processing unit 103 predicts the next status of each cluster based on the current status (including the position and the heat rate) of each cluster by using the Kalman filter as the tracking algorithm, and continues to update the foregoing probability distribution.

It is worth noting that, in the foregoing embodiment, the physiological characteristic is selected as the heart rate. In some embodiments of the present invention, the physiological characteristic is selected as a respiratory rate. The present invention does not limit the selected physiological characteristic, as long as the selected physiological characteristic can be detected by the radar unit 105 and can represent the cluster of the current frame.

Still referring to FIG. 6 and FIG. 7, as described above, by projecting the object (the object 602) detected in the current FOV of the radar unit 105 of the radar detection system 100 onto the plane 601 (the object projection 602') corresponding to the current FOV, a current FOV coordinate system defined by angles can be generated for the current FOV of the radar unit 105. The total FOV obtained by controlling the FOV direction of the radar unit 105 may define a corresponding total FOV coordinate system 701 by using angles. Referring to FIG. 6, FIG. 7, and FIG. 8, by means of the foregoing current FOV coordinate system and the total FOV coordinate system 701, the processing unit 103 can convert movement of the object detected by the radar unit 105 to coordinates. For example, in FIG. 6, the object 602 becomes an object 603 after movement, and a projection of the object 603 on the plane 601 corresponding to the current FOV is an object projection 603'. As shown in FIG. 8, the processing unit 103 may provide two-dimensional coordinates to the object projection 602' and the object projection 603' according to positions of the object projection 602' and the object projection 603' on the plane 601 corresponding to the current FOV. The processing unit 103 may determine, based on the two-dimensional coordinates of the object projection 602' and the object projection 603', whether the object 602 will move outside the current FOV of the radar unit 105.

Figure 9:
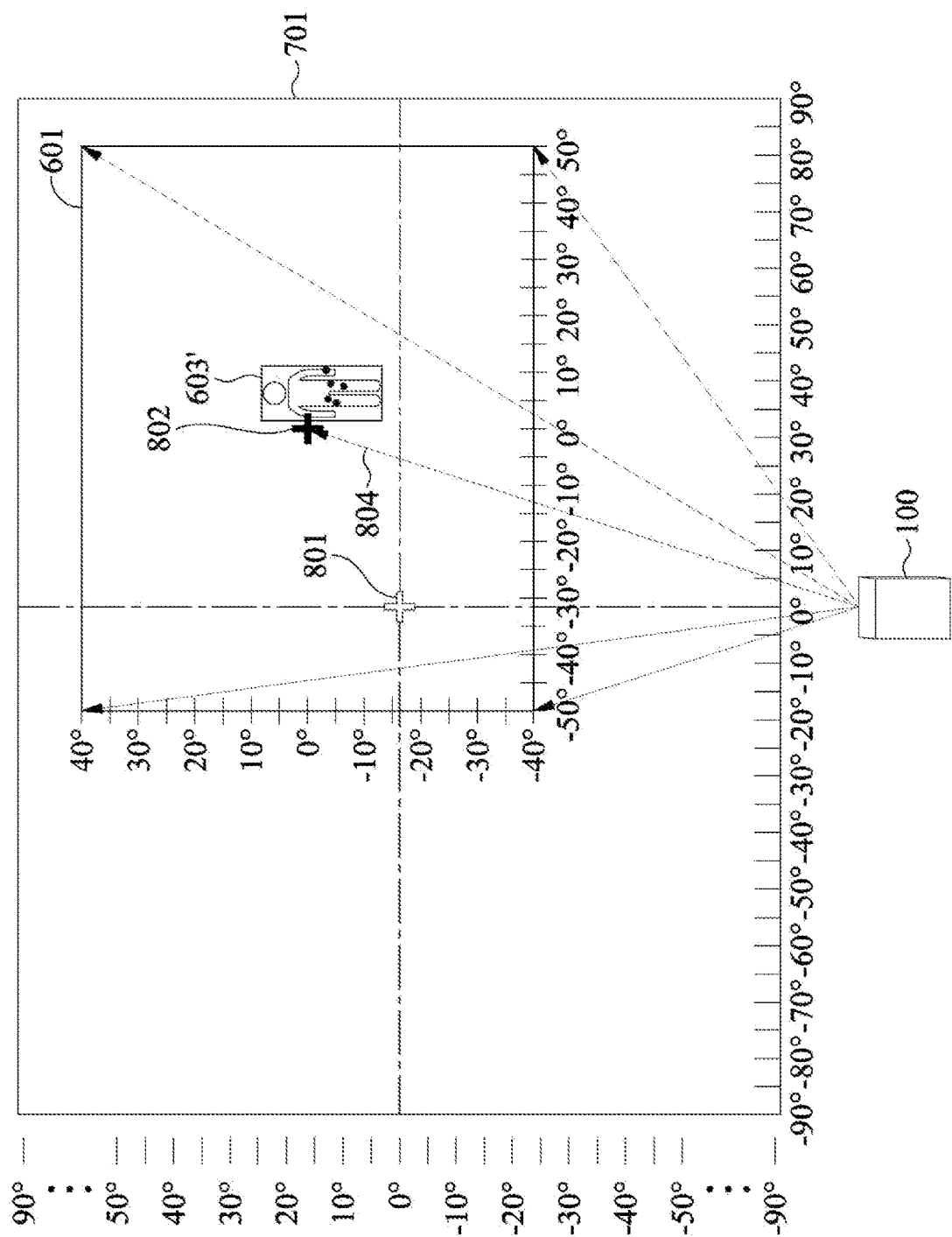
FIG. 9 is a schematic diagram of the current FOV, the total FOV, and the image coordinates according to an embodiment of the present invention.

FIG. 9 is a schematic diagram of the current FOV, the total FOV, and the image coordinates according to an embodiment of the present invention. Referring to FIG. 6 to FIG. 9, in some embodiments of the present invention, the displacement in step S1104 is a predetermined fixed quantity. The displacement includes a first fixed component and a second fixed component. For example, the first fixed component is 15°, and the second fixed component is 10°. The current status of each cluster includes a current coordinate position of the current FOV coordinate system. Step S1104 further includes determining, by the processing unit 103, an edge of the current FOV based on the first fixed component and the second fixed component. For example, the first fixed component is 15°, and the second fixed component is 10°. In this case, the edge of the current FOV is an area having a horizontal angle ranging from 35° to 50° and −50° to −35° and a vertical angle ranging from 30° to 40° and −40° to −30° in the plane 601 in FIG. 7. The processing unit 103 determines, based on the current coordinate position of the tracked cluster in the current FOV coordinate system, whether the tracked cluster is located on the edge of the current FOV of the radar unit 105.

Figure 18:
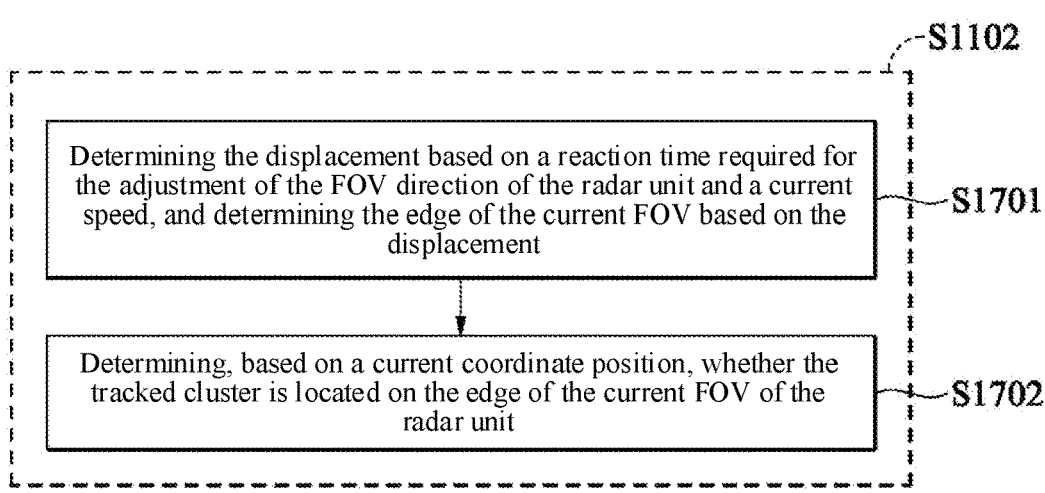
FIG. 18 is a flowchart of the radar FOV direction adjustment method according to some embodiments of the present invention.

FIG. 18 is a flowchart of the radar FOV direction adjustment method according to some embodiments of the present invention. Referring to FIG. 6 to FIG. 9, and FIG. 18, in the embodiment shown in FIG. 18, the current status of each cluster includes the current coordinate position in the current FOV coordinate system and a current speed obtained with reference to the current FOV coordinate system. Step S1102 includes step S1701 and step S1702. In step S1701, the processing unit 103 determines the first fixed component and the second fixed component in the foregoing displacement based on a reaction time required for the adjustment of the FOV direction of the radar unit 105 and the current speed of the tracked cluster, and determines the edge of the current FOV based on the first fixed component and the second fixed component in the displacement. For example, the processing unit 103 sets the first fixed component as $V_1T$ and the second fixed component as $V_2T$ based on the reaction time required for the adjustment of the FOV direction of the radar unit 105 being T and the current speed of the tracked cluster having a first component $V_1$ and a second component $V_2$ with reference to the current FOV coordinate system.

In step S1702, the processing unit 103 determines, based on the current coordinate position of the tracked cluster in the current FOV coordinate system, whether the tracked cluster is located on the edge of the current FOV of the radar unit 105.

In this embodiment, in response to the tracked cluster being located on the edge of the current FOV, the processing unit 103 sends a control signal based on an estimated next position of the tracked cluster, to adjust the FOV direction of the radar unit 105, to cause an original point of the current FOV coordinate system, for example, an original point 802 of the current FOV coordinate system in FIG. 9 to approach a projection of the tracked cluster, for example, the object projection 603'.

In the foregoing embodiment, by using the current FOV coordinate system related to the FOV direction of the radar unit 105, the processing unit 103 can rapidly calculate the control signal to adjust the FOV direction of the radar unit 105.

Figure 10:
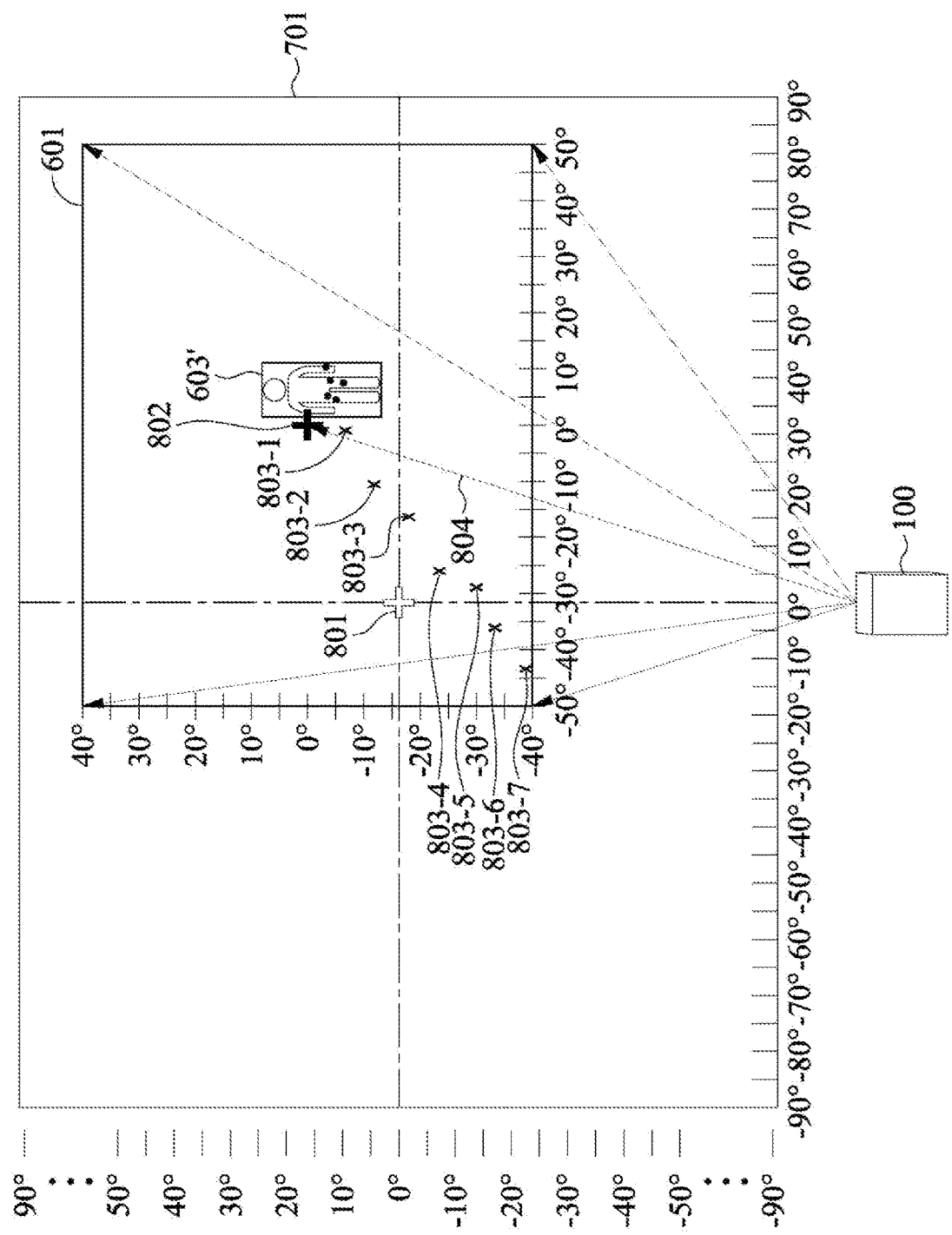
FIG. 10 is a schematic diagram of the current FOV, the total FOV, and the image coordinates according to an embodiment of the present invention.

FIG. 10 is a schematic diagram of the current FOV, the total FOV, and the image coordinates according to an embodiment of the present invention. Referring to FIG. 6 to FIG. 10, in FIG. 10, tracing points 803-1 to 803-7 form a moving trajectory of the object projection 603'. The FOV direction of the radar unit 105 is moved from an FOV direction 702 in FIG. 8 to an FOV direction 804 in FIG. 9. In this case, a central point 802 of the plane 601 of the moved current FOV does not overlap a central point 801 of the total FOV coordinate system 701. Since the processing unit 103 stores a coordinate position of the central point 802 of the plane 601 corresponding to the moved current FOV in the total FOV coordinate system 701, the processing unit 103 may express positions of the tracing points 803-1 to 803-7 with coordinates in the total FOV coordinate system 701, and stores the coordinates in the processing unit 103.

Figure 11:
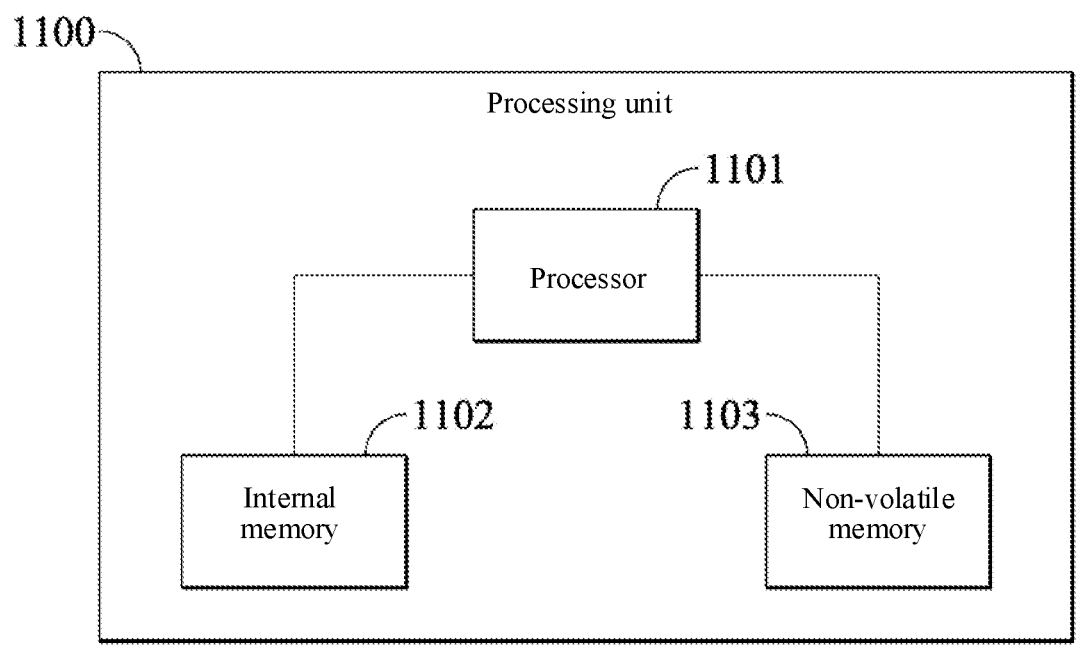
FIG. 11 is a schematic structural diagram of a processing unit according to some embodiments of the present invention.

FIG. 11 is a schematic structural diagram of a processing unit 1100 according to some embodiments of the present invention. As shown in FIG. 11, in terms of hardware, the processing unit 1100 includes a processor 1101, an internal memory 1102, and a non-volatile memory 1103. The internal memory 1102 is, for example, a random-access memory (RAM). Definitely, the processing unit 1100 may further include hardware required for other functions.

The internal memory 1102 and the non-volatile memory 1103 are configured to store a program. The program may include a program code. The program code includes a computer operation instruction. The internal memory 1102 and the non-volatile memory 1103 provide the instruction and data to the processor 1101. The processor 1101 reads a corresponding computer program from the non-volatile memory 1103 into the internal memory 1102 and then runs the program. The processor 1101 is specifically configured to perform steps recorded in FIG. 12 to FIG. 18.

The processor 1101 may be an integrated circuit chip, having a capability of processing a signal. During implementation, the methods and the steps disclosed in the foregoing embodiments may be completed by an integrated logic circuit in a hardware form in the processor 501 or the instruction in a software form. The processor 1101 may be a general-purpose processor, including a central processing unit (CPU), a tensor processing unit, a digital signal processor (DSP), an application-specific integrated circuit (ASIC), a field-programmable gate array (FPGA), or other programmable logic apparatuses. The processor can implement or perform the methods and the steps disclosed in the foregoing embodiments.

In some embodiments of the present invention, a computer-readable storage medium storing a program is further provided. The computer-readable storage medium stores at least one instruction. The at least one instruction, when executed by the processor 1101 of the processing unit 1100, can cause the processor 1101 of the processing unit 1100 to perform the steps recorded in FIG. 12-1 to FIG. 18.

Examples of a computer storage medium include but are not limited to a phase change memory (PRAM), a static random access memory (SRAM), a dynamic random access memory (DRAM), other types of random access memories (RAM), a read-only memory (ROM), an electrically erasable programmable read-only memory (EEPROM), a flash memory or other memory technologies, a compact disk read-only memory (CD-ROM), a digital versatile disc (DVD) or other optical storages, a cartridge storage, a magnetic tape disk storage or other magnetic storage devices or any other non-transmitting medium that may be configured to store information accessible by a computing device. According to the definition herein, the computer-readable medium does not include transitory computer-readable media, such as modulated data signals and carriers.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A radar detection system, comprising:
   a radar unit, configured to generate a radio frequency signal, radiate the radio frequency signal, receive a feedback signal, and demodulate and digitalize the feedback signal to obtain a digital feedback signal;
   a pointing control unit, configured to adjust a field of view direction of the radar unit based on a control signal; and
   a processing unit, configured to perform the following steps in one scanning round:
   (a) obtaining at least one cluster of a current frame and a current status and a next status of each of the at least one cluster based on the digital feedback signal; and
   (b) determining a displacement, and determining the edge of the current field of view based on the displacement; and determining, based on the current status of a tracked cluster in the at least one cluster, whether the tracked cluster is located on an edge of a current field of view of the radar unit; and sending the control signal based on the next status of the tracked cluster in response to the tracked cluster being located on the edge of the current field of view, to adjust the field of view direction of the radar unit;
   wherein the current status of each of the at least one cluster comprises a current coordinate position and a current speed, and step (b) comprises: determining, by the processing unit, the displacement based on a reaction time required for the adjustment of the field of view direction of the radar unit and the current speed, and determining, based on the current coordinate position, whether the tracked cluster is located on the edge of the current field of view of the radar unit.

2. The radar detection system according to claim 1, wherein step (a) performed by the processing unit in the scanning round comprises:
   (a1) generating a point cloud image based on the digital feedback signal;
   (a2) performing a clustering analysis on the point cloud image according to a clustering algorithm to obtain the at least one cluster of the current frame and obtain the current status of each of the at least one cluster based on current information of the current frame; and
   (a3) determining an identification mark of each of the at least one cluster by using a calculation program, previous information of a previous frame, and the current status of each of the at least one cluster, and predicting the next status of each of the at least one cluster based on the current status of each of the at least one cluster.

3. A radar detection system, comprising:
   a radar unit, configured to generate a radio frequency signal, radiate the radio frequency signal, receive a feedback signal, and demodulate and digitalize the feedback signal to obtain a digital feedback signal;
   a pointing control unit, configured to adjust a field of view direction of the radar unit based on a control signal; and
   a processing unit, configured to perform the following steps in one scanning round:
   (a) obtaining at least one cluster of a current frame and a current status and a next status of each of the at least one cluster based on the digital feedback signal; and
   (b) determining a displacement, and determining the edge of the current field of view based on the displacement; and determining, based on the current status of a tracked cluster in the at least one cluster, whether the tracked cluster is located on an edge of a current field of view of the radar unit; and sending the control signal based on the next status of the tracked cluster in response to the tracked cluster being located on the edge of the current field of view, to adjust the field of view direction of the radar unit;
   wherein the displacement is a predetermined fixed quantity, the current status of each of the at least one cluster comprises a current coordinate position, and step (b) comprises: determining, based on the current coordinate position of the tracked cluster, whether the tracked cluster is located on the edge of the current field of view of the radar unit.

4. The radar detection system according to claim 2, wherein the calculation program comprises an association algorithm and a tracking algorithm, the previous information of the previous frame comprises a tracked object status of at least one tracked object, and step (a3) comprises: establishing, by the processing unit, an association between the at least one cluster and the at least one tracked object by using the association algorithm based on the tracked object status of each of the at least one tracked object and the current status of each of the at least one cluster, to determine the identification mark of each of the at least one cluster, and predicting the next status of each of the at least one cluster by using the tracking algorithm based on the current status of each of the at least one cluster.

5. The radar detection system according to claim 4, wherein the calculation program comprises the association algorithm and the tracking algorithm, the previous information of the previous frame comprises the tracked object status of the at least one tracked object, and step (a3) further comprises: predicting, by the processing unit in response to at least one unassociated tracked object for which the association is not established with the at least one cluster existing in the at least one tracked object, a next tracked object status of each of the at least one unassociated tracked object by using the tracking algorithm based on a tracked object status of each of the at least one unassociated tracked object, to provide a status prediction for each of the at least one unassociated tracked object.

6. The radar detection system according to claim 4, wherein the association algorithm is selected from a group consisting of a Hungarian algorithm, global nearest neighbor, a probabilistic data association filter, and a joint probabilistic data association filter.

7. The radar detection system according to claim 2, wherein the calculation program comprises a probability calculation program and a tracking algorithm, the current status of each of the at least one cluster comprises a status component, the previous information of the previous frame comprises at least one probability distribution related to the status component of the current status and the identification mark of each of the at least one cluster, and the probability calculation program comprises calculating, according to the at least one probability distribution and the status component of the current status of each of the at least one cluster, a probability that the identification mark of each of the at least one cluster is an article in a category; and step (a3) comprises: determining the identification mark of each of the at least one cluster based on the probability that the identification mark of each of the at least one cluster is the article in the category; and predicting, by the processing unit, the next status of each of the at least one cluster by using the tracking algorithm based on the current status of each of the at least one cluster, wherein the status component of the current status is selected from a group consisting of a position and a physiological characteristic.

8. The radar detection system according to claim 2, wherein the radio frequency signal is a frequency modulated continuous wave (FMCW) signal, and step (a1) comprises:
  (a11) performing range processing and Doppler processing on a raw data cube formed by the digital feedback signal, to obtain a processed data cube;
  (a12) performing moving target indication (MTI) on the processed data cube to remove a static point in the processed data cube;
  (a13) after step (a12), removing, by using a detection algorithm, a point in the processed data cube generated by a noise background; and
  (a14) after step (a13), performing angle processing on the processed data cube to generate the point cloud image.

9. The radar detection system according to claim 2, wherein the clustering algorithm is selected from a group consisting of peak grouping, density-based spatial clustering of applications with noise, modified density-based spatial clustering of applications with noise, and hierarchical density-based spatial clustering of applications with noise; and the processing unit determines a position of the current status of each of the at least one cluster based on a physical center of the cluster, wherein the physical center is selected from a group consisting of a centroid of a plurality of corresponding point clouds of the cluster and a central point of an outer frame of the cluster.

10. The radar detection system according to claim 2, wherein the radar unit comprises an antenna unit and a front-end unit, the antenna unit is configured to radiate the radio frequency signal to a free space and receive the feedback signal, and the front-end unit is configured to generate the radio frequency signal and demodulate and digitalize the feedback signal to obtain the digital feedback signal.

11. A radar field of view direction adjustment method, applicable to a radar detection system and performed by a processing unit, the radar detection system comprising:
  a radar unit, configured to generate a radio frequency signal, radiate the radio frequency signal, receive a feedback signal, and demodulate and digitalize the feedback signal to obtain a digital feedback signal;
  a pointing control unit, configured to adjust a field of view direction of the radar unit based on a control signal; and
  the processing unit; and
  the field of view direction adjustment method comprising the following steps in one scanning round:
  (a) obtaining at least one cluster of a current frame and a current status and a next status of each of the at least one cluster based on the digital feedback signal; and
  (b) determining a displacement, and determining, based on the current status of a tracked cluster in the at least one cluster, whether the tracked cluster is located on an edge of a current field of view of the radar unit; and sending the control signal based on the next status of the tracked cluster in response to the tracked cluster being located on the edge of the current field of view, to adjust the field of view direction of the radar unit;
  wherein the current status of each of the at least one cluster comprises a current coordinate position and a current speed, and step (b) comprises: determining, by the processing unit, the displacement based on a reaction time required for the adjustment of the field of view direction of the radar unit and the current speed, and determining, based on the current coordinate position, whether the tracked cluster is located on the edge of the current field of view of the radar unit.

12. The field of view direction adjustment method according to claim 11, wherein step (a) comprises:
  (a1) generating a point cloud image based on the digital feedback signal;
  (a2) performing a clustering analysis on the point cloud image according to a clustering algorithm to obtain the at least one cluster of the current frame and obtain the current status of each of the at least one cluster based on current information of the current frame; and
  (a3) determining an identification mark of each of the at least one cluster by using a calculation program, previous information of a previous frame, and the current status of each of the at least one cluster, and predicting the next status of each of the at least one cluster based on the current status of each of the at least one cluster.

13. A radar field of view direction adjustment method, applicable to a radar detection system and performed by a processing unit, the radar detection system comprising:
  a radar unit, configured to generate a radio frequency signal, radiate the radio frequency signal, receive a feedback signal, and demodulate and digitalize the feedback signal to obtain a digital feedback signal;
  a pointing control unit, configured to adjust a field of view direction of the radar unit based on a control signal; and
  the processing unit; and
  the field of view direction adjustment method comprising the following steps
  in one scanning round:
  (a) obtaining at least one cluster of a current frame and a current status and a next status of each of the at least one cluster based on the digital feedback signal; and
  (b) determining a displacement, and determining, based on the current status of a tracked cluster in the at least one cluster, whether the tracked cluster is located on an edge of a current field of view of the radar unit; and sending the control signal based on the next status of the tracked cluster in response to the tracked cluster being located on the edge of the current field of view, to adjust the field of view direction of the radar unit;
  wherein the displacement is a predetermined fixed quantity, the current status of each of the at least one cluster comprises a current coordinate position, and step (b) comprises: determining, based on the current coordinate position of the tracked cluster, whether the tracked cluster is located on the edge of the current field of view of the radar unit.

14. The field of view direction adjustment method according to claim 12, wherein the calculation program comprises an association algorithm and a tracking algorithm, the previous information of the previous frame comprises a tracked object status of at least one tracked object, and step (a3) comprises: establishing, by the processing unit, an association between the at least one cluster and the at least one tracked object by using the association algorithm based on the tracked object status of each of the at least one tracked object and the current status of each of the at least one cluster, to determine the identification mark of each of the at least one cluster, and predicting the next status of each of the at least one cluster by using the tracking algorithm based on the current status of each of the at least one cluster.

15. The field of view direction adjustment method according to claim 12, wherein the calculation program comprises a probability calculation program and a tracking algorithm, the current status of each of the at least one cluster comprises a status component, the previous information of the previous frame comprises at least one probability distribution related to the status component of the current status and the identification mark of each of the at least one cluster, and the probability calculation program comprises calculating a probability, according to the at least one probability distribution and the status component of the current status of each of the at least one cluster, that the identification mark of each of the at least one cluster is a number; and step (a3) comprises: determining the identification mark of each of the at least one cluster based on the probability that the identification mark of each of the at least one cluster is the number; and predicting, by the processing unit, the next status of each of the at least one cluster by using the tracking algorithm based on the current status of each of the at least one cluster.

16. The field of view direction adjustment method according to claim 12, wherein the calculation program comprises a probability calculation program and a tracking algorithm, the current status of each of the at least one cluster comprises a position and a physiological characteristic, the previous information of the previous frame comprises at least one first probability distribution related to the position of the current status and the identification mark of each of the at least one cluster and at least one second probability distribution related to the physiological characteristic of the current status and the identification mark of each of the at least one cluster, and the probability calculation program comprises calculating, according to the at least one first probability distribution and the position of the current status of each of the at least one cluster, a first probability that the identification mark of each of the at least one cluster is a number and calculating, according to the at least one second probability distribution and the physiological characteristic of the current status of each of the at least one cluster, a second probability that the identification mark of each of the at least one cluster is the number; and step (a3) comprises: determining the identification mark of each of the at least one cluster based on the first probability and the second probability that the identification mark of each of the at least one cluster is the number; and predicting, by the processing unit, the next status of each of the at least one cluster by using the tracking algorithm based on the current status of each of the at least one cluster.

17. The field of view direction adjustment method according to claim 12, wherein the radio frequency signal is a frequency modulated continuous wave signal, and step (a1) comprises:
 (a11) performing range processing and Doppler processing on a raw data cube formed by the digital feedback signal, to obtain a processed data cube;
 (a12) performing moving target indication on the processed data cube to remove a static point in the processed data cube;
 (a13) after step (a12), removing, by using a detection algorithm, a point in the processed data cube generated by a noise background; and
 (a14) after step (a13), performing angle processing on the processed data cube to generate the point cloud image.

18. The field of view direction adjustment method according to claim 12, wherein the clustering algorithm is selected from a group consisting of peak grouping, density-based spatial clustering of applications with noise, modified density-based spatial clustering of applications with noise, and hierarchical density-based spatial clustering of applications with noise; and wherein the processing unit determines a position of the current status of each of the at least one cluster based on a physical center of the cluster, wherein the physical center is selected from a group consisting of a centroid of a plurality of corresponding point clouds of the cluster and a central point of an outer frame of the cluster.

\* \* \* \* \*